US012573253B2

(12) United States Patent
Lin et al.

(10) Patent No.:  US 12,573,253 B2
(45) Date of Patent:      Mar. 10, 2026

(54) TOUCHSCREEN FOR ELECTRONIC LOCKS

(71) Applicant: ASSA ABLOY Americas Residential Inc., New Haven, CT (US)

(72) Inventors: James Lin, Lake Forest, CA (US); Elena Gorkovenko, Lake Forest, CA (US); Zachary Keoki Hong, Lake Forest, CA (US); Kevin Pasma, Lake Forest, CA (US); Changpeng Song, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 734 days.

(21) Appl. No.: 17/829,789

(22) Filed: Jun. 1, 2022

(65) Prior Publication Data

US 2022/0383682 A1      Dec. 1, 2022

Related U.S. Application Data

(60) Provisional application No. 63/195,340, filed on Jun. 1, 2021.

(51) Int. Cl.
| | |
|---|---|
| *G07C 9/23* | (2020.01) |
| *E05B 17/22* | (2006.01) |
| *G06F 3/044* | (2006.01) |
| *G07C 9/00* | (2020.01) |
| *G07C 9/25* | (2020.01) |

(52) U.S. Cl.
CPC ............... *G07C 9/23* (2020.01); *G06F 3/044* (2013.01); *G07C 9/00563* (2013.01); *G07C 9/257* (2020.01); *E05B 17/226* (2013.01)

(58) Field of Classification Search
None
See application file for complete search history.

(56) References Cited

U.S. PATENT DOCUMENTS

| | | | | |
|---|---|---|---|---|
| 2016/0115713 A1* | 4/2016 | Lin | .......................... | E05B 47/00 70/266 |
| 2017/0351850 A1* | 12/2017 | Jin | .......................... | G06F 21/32 |

* cited by examiner

*Primary Examiner* — Stephen T. Reed
(74) *Attorney, Agent, or Firm* — Merchant & Gould P.C.

(57) ABSTRACT

Systems and methods are disclosed for a lock assembly having a touchscreen. The lock assembly includes an interior assembly and an exterior assembly having an exterior lock housing and a touchscreen assembly. The touchscreen assembly includes a touchscreen having selectable icons on a front surface thereof, a printed circuit board assembly (PCBA), and a support structure. The PCBA includes input regions corresponding to the selectable icons and light emitters. The support structure is configured to reflect light emitted from the light emitters through the front surface of the touchscreen.

27 Claims, 19 Drawing Sheets

TOUCHSCREEN FOR ELECTRONIC LOCKS

CROSS-REFERENCE TO RELATED APPLICATIONS

The present application claims priority from U.S. Provisional Patent Application No. 63/195,340, filed on Jun. 1, 2021, the disclosure of which is hereby incorporated by reference in its entirety

TECHNICAL FIELD

This disclosure relates to electronic locks and in particular, to touchscreens for electronic locks.

BACKGROUND

Electronic locks have gained increasing acceptance and widespread use in residential and commercial markets. These locksets control ingress through doors in a building by requiring certain electronic credentials. For example, these locksets typically include a control circuit that determines whether to unlock the lockset based on credentials provided by the user. In some cases, for example, the credentials and/or commands may be provided through a touch-sensitive surface, such as a touchscreen.

Touchscreen assemblies may include multiple control circuits, complicated assemblies, and various components which may be relatively expensive both in materials and to manufacture. In addition, a common problem with some touchscreen assemblies can be an uneven distribution of light across the screen (or "hot spots" that result in a portion of the screen appearing brighter). The icons on some touchscreens may appear dim and hard to see because of the low concentration of light reaching the front surface of the touchscreen and/or light dissipating within the lock housing. In some cases, portions of the internal assembly may also be visible to a user through the screen due to the reflection and/or refraction of light throughout the assembly, which may result in an undesirable screen appearance.

SUMMARY

In a first aspect, a lock assembly having a touchscreen assembly is disclosed. The lock assembly includes an interior assembly and an exterior assembly having an exterior lock housing and the touchscreen assembly. The touchscreen assembly includes a touchscreen having selectable icons on a front surface thereof, a printed circuit board assembly (PCBA), and a support structure. The PCBA includes input regions corresponding to the selectable icons and light emitters. The support structure is configured to reflect light emitted from the light emitters through the front surface of the touchscreen.

In a second aspect, a touchscreen assembly is disclosed. The touchscreen assembly includes a touchscreen having selectable icons on a front surface thereof, a PCBA, and a support structure. The PCBA includes input regions corresponding to the selectable icons and light emitters. The support structure includes icon cavities corresponding to the selectable icons and configured to reflect light emitted from the light emitters through the front surface of the touchscreen.

In a third aspect, a lock assembly is disclosed. The lock assembly includes an interior assembly and an exterior assembly. The exterior assembly includes an exterior lock housing and a touchscreen assembly. The touchscreen assembly includes a touchscreen having a plurality of icons on a front surface of the touchscreen, a PCBA having a front face and a rear face, multiple light emitters positioned on the rear face of the PCBA, and a support structure configured to reflect light emitted from the light emitters toward the front surface of the touchscreen.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
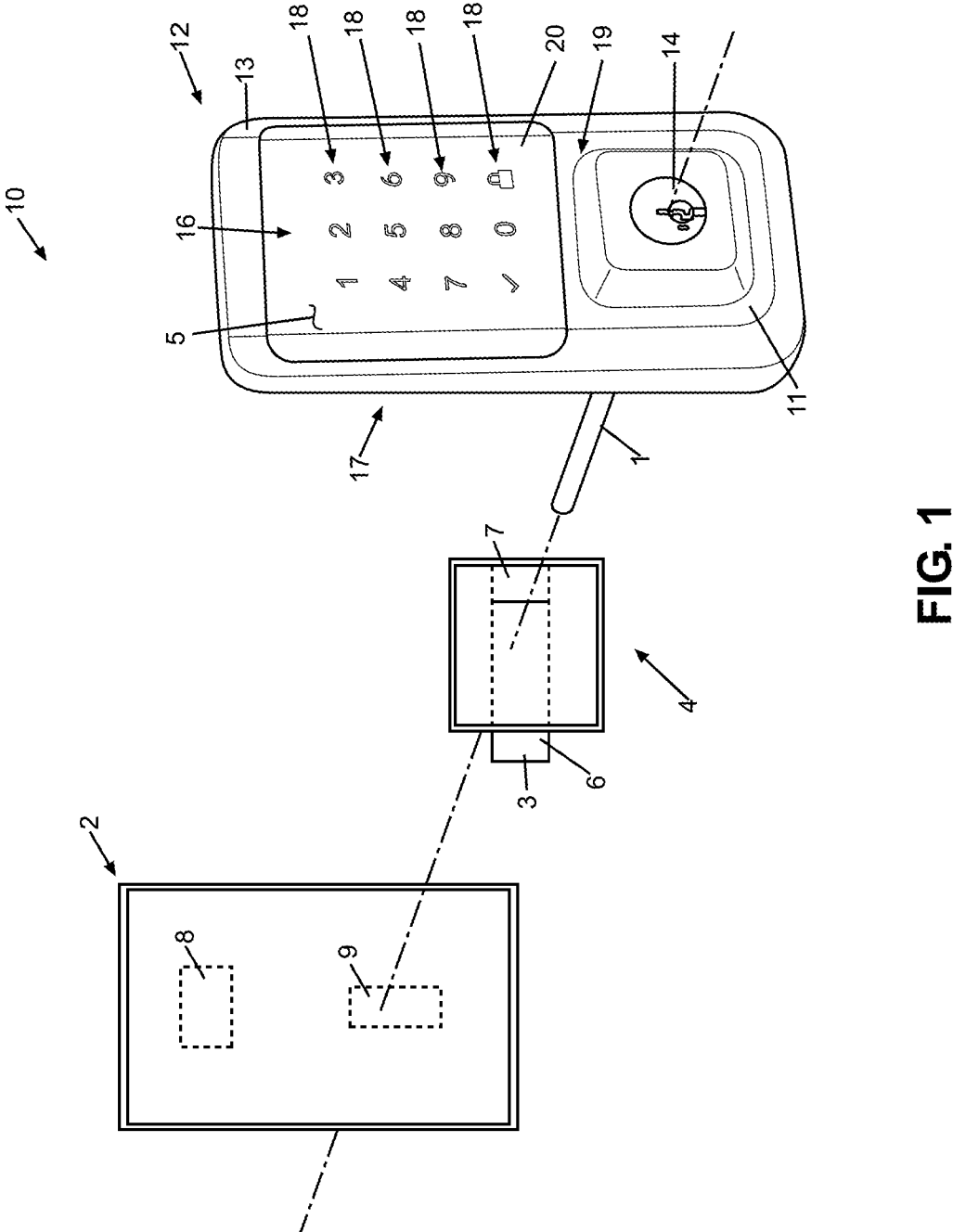
FIG. 1 illustrates a perspective view of an electronic lock with a touchscreen, according to some embodiments.

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed disclosure.

As briefly described above, embodiments of the present disclosure are directed to an improved touchscreen assembly for access/entry systems, for example electronic locks. The touchscreen assembly includes a PCBA including light emitters positioned on the rear face thereof. The light emitters produce light that is directed away from the touchscreen, toward a reflective surface (e.g., a support structure) within the touchscreen assembly. The light hits the reflective surface and reflects back toward (e.g., light changes direction, approximately 180 degree change in direction) and through the front surface of the touchscreen. The touchscreen includes various icons through which the light shines, thereby illuminating the icons on the screen.

In some embodiments, the touchscreen assembly uses a single PCBA, a light isolator, and a support structure, among other components. The light isolator includes multiple light channels that allow light through, while the remainder of the light isolator is structured to block light. At least one light emitter is positioned to direct light through a light channel (e.g., positioned within the light channel). The light from the light emitter travels through the light channel toward the support structure, reflects off surfaces formed in the support structure, changes direction, and is emitted through the front surface of the touchscreen, thereby illuminating transparent portions of the touchscreen (e.g., icons, logos). In some embodiments, the support structure includes an integrated loop to retain any wires that may be used as part of the electrical connection between the lock and touchscreen components. In some embodiments, the touchscreen assembly includes a light diffuser positioned between the PCBA and the touchscreen, which diffuses and homogenizes the light produced by the light emitters.

The touchscreen assembly described herein reduces the cost of materials and manufacture in addition to improving overall functionality of the touchscreen relative to conventional touchscreens (e.g., in particular, electronic lock touchscreens). As described further herein, the touchscreen assembly includes a light isolation component having light isolation channels and cavities. Accordingly, the light produced by the touchscreen assembly is isolated within certain channels and cavities, thereby reducing (e.g., eliminating) the bleeding of light to other portions of the touchscreen assembly (e.g., outside the channels and cavities). As a result, the brightness and clarity of the light produced by the touchscreen assembly is increased. In addition, because of this arrangement, the touchscreen assembly described herein improves upon the uniformity of the light distribution across the touchscreen (i.e., potential for light unevenness (e.g., hot spots) on the touchscreen is reduced or eliminated).

The touchscreen assembly described herein uses a single PCBA, thereby limiting the cost and complexity of materials, manufacturing, and assembly as compared with traditional touchscreens. In some embodiments, the touchscreen assembly includes a support structure with an integrated loop to retain any wires that may be used as part of the electrical connection between the lock and touchscreen components. As such, the likelihood of snags or damage to the wires is reduced, in addition to providing for easier assembly for a user (e.g., moving the wires out of the way of the lock components during install and connection).

FIG. 1 shows a lock assembly 10, according to some embodiments of the disclosure. The lock assembly 10 includes an exterior assembly 12 having an exterior lock housing 13. Typically, the exterior assembly 12 is mounted on the outside of a door (not shown), while an interior assembly 2 is mounted inside a door. The lock assembly 10 includes a latch assembly 4 that is typically mounted in a bore formed in the door. The latch assembly 4 includes a bolt 6 that is movable between an extended position 3 (locked) and a retracted position 7 (unlocked). Specifically, the bolt 6 is configured to slide longitudinally and, when the bolt 6 is retracted, the door is in an unlocked state. When the bolt is extended, the bolt 6 protrudes from the door into a doorjamb (not shown) to place the door in a locked state.

In the example shown, the exterior assembly 12 has a torque blade 1 extending from the rear portion 17. The torque blade 1 extends through an adaptor (not shown), which is received within a bore in a door to which the lock assembly 10 is being installed or mounted. If the user is inside the door, a turn piece 9 could be manually rotated by the user to actuate the torque blade 1, thereby moving the bolt 6 between the extended position 3 and retracted position 7. The interior assembly 2 includes a battery 8 to power the lock assembly 10. In one example, the battery 8 may be a standard single-use (disposable) battery. Alternatively, the battery 8 may be rechargeable. In still further embodiments, the battery 8 is optional altogether, replaced by an alternative power source (e.g., an AC power connection).

The term "outside" is broadly used to mean an area outside a door and "inside" is broadly used to denote an area inside a door. With an exterior entry door, for example, the exterior assembly 12 may be mounted outside a building, while the interior assembly may be mounted inside a building. With an interior door, the exterior assembly 12 may be mounted inside a building, but outside a room(s) secured by the lock assembly 10; the interior assembly may be mounted inside the secured room(s). The lock assembly 10 is applicable to both interior and exterior doors. It should be noted that the lock assembly 10 may be used on other types of doors, such as a garage door or a doggie door, or other types of doors that may be used with a touchscreen.

In the example shown, the exterior assembly 12 is in the form of a deadbolt. As discussed above, however, this disclosure is not intended to be limited to only an electronic deadbolt, but instead encompasses any kind of lock (e.g., cabinet lock, padlock, locker lock, lever, knob). As shown, the exterior assembly 12 includes an exterior lock housing 13 that houses internal components of the exterior assembly 12. In the example shown, the exterior lock housing 13 has a decorative shape with a rear portion 17 that would be adjacent/abutting a door (not shown) and a front portion 19 extending from the door. In various embodiments, the exterior assembly 12 and exterior lock housing 13 could have a wide variety of different sizes and shapes depending on the particular circumstances.

Referring to FIG. 1, in the embodiment shown, the front portion 19 of the exterior assembly 12 includes a front cover 11 that surrounds a mechanical lock assembly 14. A mechanical key (not shown) may be inserted into the mechanical lock assembly 14 to mechanically unlock the lock assembly 10.

The exterior assembly 12 includes a touchscreen 20 for receiving user input. In the embodiment shown, the touchscreen 20 is included with the front cover 11. In this example, the touchscreen 20 is formed substantially in the shape of a rectangle and positioned toward the center of the front cover 11 and above the mechanical lock assembly 14.

However, the touchscreen 20 could be formed in other shapes or positioned differently on the exterior assembly 12. In other embodiments, portions of the touchscreen 20 could be a light communication device with no touch input capability. In various embodiments, the exterior assembly 12 can include only a touchscreen 20 with no keyway to accept a mechanical key (e.g., mechanical lock assembly 14).

When a user inputs a valid actuation passcode into the touchscreen 20, the bolt 6 of the lock assembly 10 is moved between the extended position 3 and retracted position 7. In some examples, the exterior assembly 12 is electrically connected to the interior assembly 2. Specifically, the touchscreen 20 is electrically connected to the interior assembly 2, specifically to control circuitry (e.g., a processing unit), by, for example, an electrical cable (shown as wiring harness 30 in FIGS. 3-4) that passes through the door. When the user inputs a valid actuation passcode via the touchscreen 20 that is recognized by the processing unit, an electric motor is energized to retract the bolt 6 of latch assembly 4, thus permitting door to be opened from a closed position.

Still referring to FIG. 1, the touchscreen 20 allows a user to control one or more operations of the lock assembly 10. The touchscreen 20 is in electrical communication with a control circuit, which may include a single controller (e.g., microcontroller), one or more controllers (e.g., microcontrollers), or one or more other electrical devices (e.g., processor, memory, and input/output peripherals) in communication with one another (e.g., a printed circuit board assembly (PCBA) 24). The touchscreen 20 provides a user interface for a user to communicate with the control circuit so that the user can input instructions or credentials to operate the lock (e.g., unlock, lock the deadbolt). Thus, the touchscreen 20 is adapted to receive one or more inputs from the user.

In this example, the touchscreen 20 is a capacitive touchscreen. Accordingly, the exterior assembly 12 uses capacitive sensing to determine when a user touches the touchscreen 20. The touch surface for capacitive sensing to actuate the lock assembly 10 could also include another external surface, including, but not limited to, the exterior lock housing 13, the keyway, handle, rose, or other exterior surface of the lock assembly 10. In other embodiments, the touchscreen 20 may be any suitable type of touchscreen, including but not limited to, a resistive touchscreen, a surface acoustic wave (SAW) touchscreen, a surface capacitance touchscreen, a projected capacitance touchscreen, an infrared touchscreen, an optical imaging touchscreen, a dispersive technology touchscreen, and an acoustic recognition touchscreen.

Figure 2:
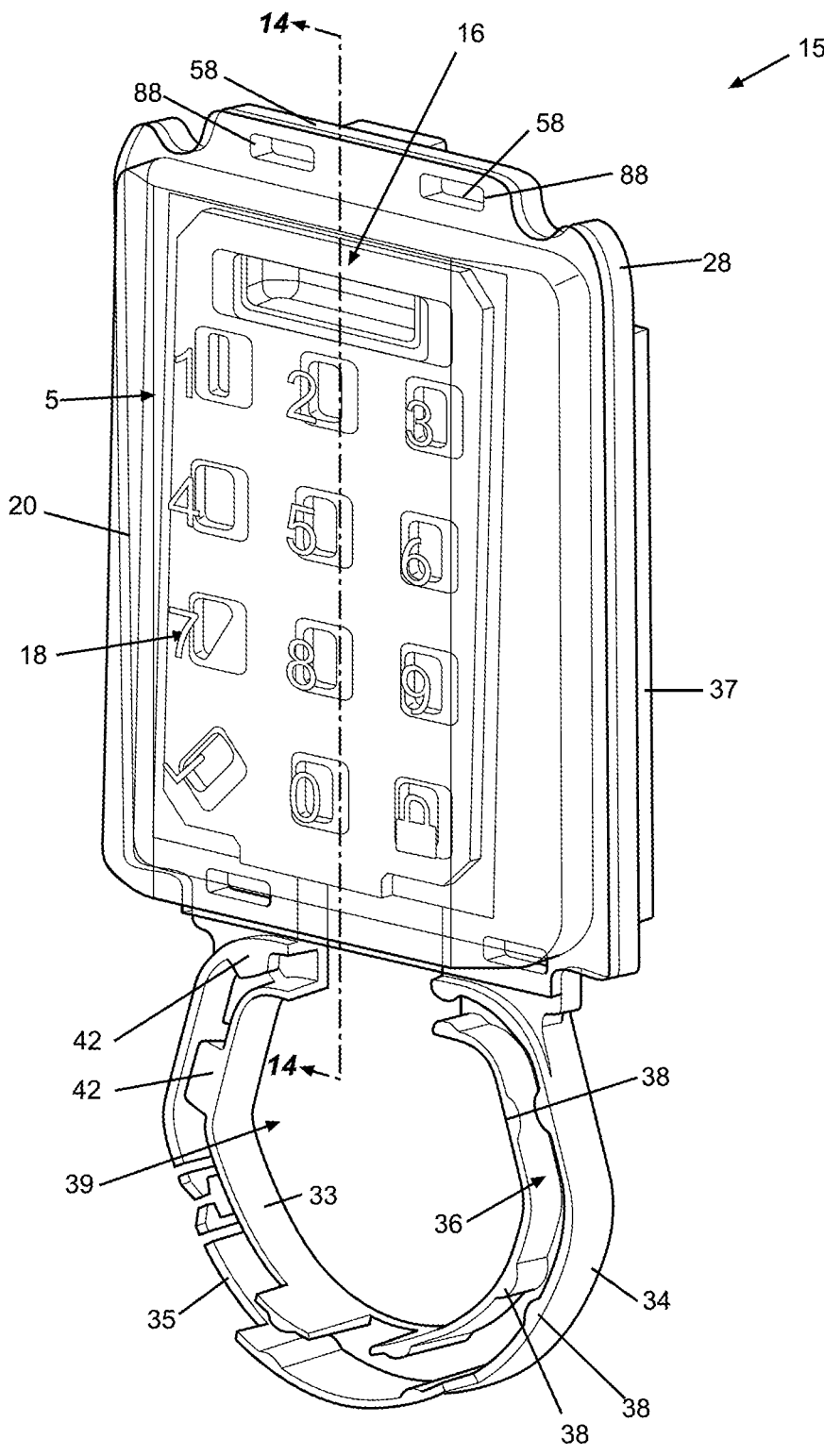
FIG. 2 illustrates a perspective view of a touchscreen assembly of the electronic lock of FIG. 1.

Referring to FIGS. 1-2, in the illustrated embodiment and as described further herein, a touchscreen assembly 15 generates light that reflects within the touchscreen assembly 15 and back through a front surface 5 of the touchscreen 20. The front surface 5 of the touchscreen 20 includes transparent portions shaped as text (e.g., logo 16) and icons 18 in the form of numbers and shapes. The logo 16 and icons 18 may be of other configurations and/or of other symbols without departing from the scope of the present disclosure. As the light reflects back toward the front surface 5, the transparent portions (e.g., logo 16 and icons 18) allow light to shine through the front surface 5, while the remainder of the front surface 5 blocks the light. In some embodiments, the front surface 5 is painted, with transparent portions left unpainted. In an alternative embodiment, indicia including logo 16 and icons 18 may be otherwise applied to the surface of the touchscreen.

In some embodiments, some portions of the touchscreen 20 are configured to receive user input (e.g., icons 18) and some portions of the touchscreen 20 may be incapable of receiving user input or are static (e.g., logo 16). In response to a finger or other object touching the location on the touchscreen 20 corresponding to each icon 18 (i.e., in response to an input by the user), the touchscreen 20 sends a signal to the control circuit identifying the specific icon 18 selected. In response to the user inputting a predetermined series of inputs (e.g., valid/authenticated credentials), the lock assembly 10 is programmed and structured to unlock the lock (e.g., control circuit operates the lock assembly 10 to unlock). In some embodiments, in response to the user selecting/touching a certain icon 18 or series of icons 18, the lock assembly 10 is programmed and structured to lock (e.g., control circuit operates the lock assembly 10 to lock).

The touchscreen 20 also includes multiple regions that could be independently controlled to visually communicate messages to the user, including but not limited to, an action currently being processed by the lock assembly 10, information about the status of the lock assembly 10, and/or requests for user input. By way of example, the touchscreen 20 could visually communicate messages to the user by controlling various attributes of the regions, such as turning regions on/off, changing intensity of regions, changing colors illuminated by regions, or other manners of changing the illumination of the touchscreen 20.

In alternative embodiments, one or more other types of user interface devices can be incorporated into the lock assembly 10. For example, in example implementations, the exterior assembly 12 can include a biometric interface (e.g., a fingerprint sensor, retina scanner, or camera including facial recognition), or an audio interface by which voice recognition could be used to actuate the lock. Still further, other touch interfaces may be implemented, e.g., where a single touch may be used to actuate the lock rather than requiring entry of a specified actuation passcode.

Figure 3:
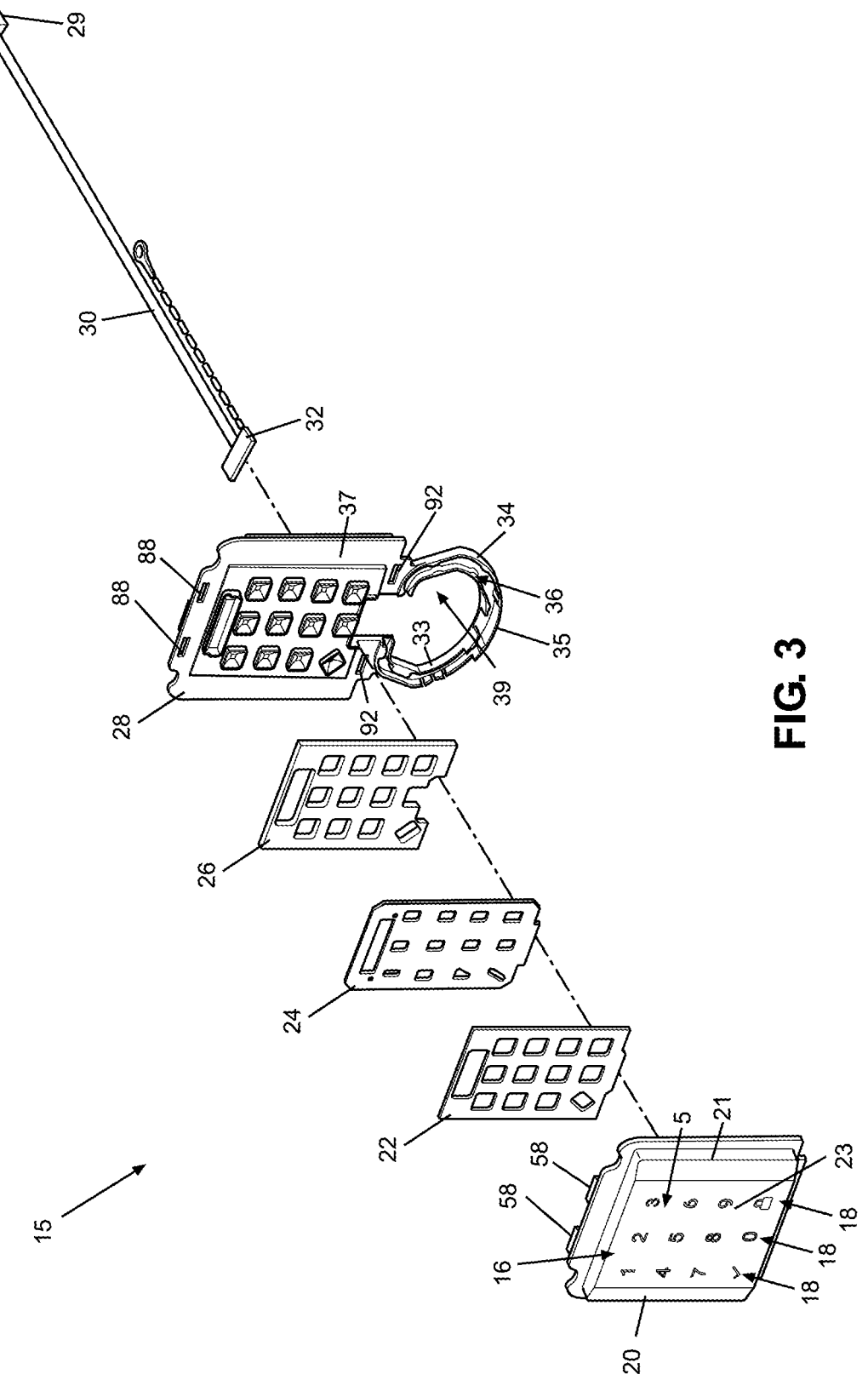
FIG. 3 illustrates a front exploded perspective view of the touchscreen assembly of FIG. 2.
Figure 4:
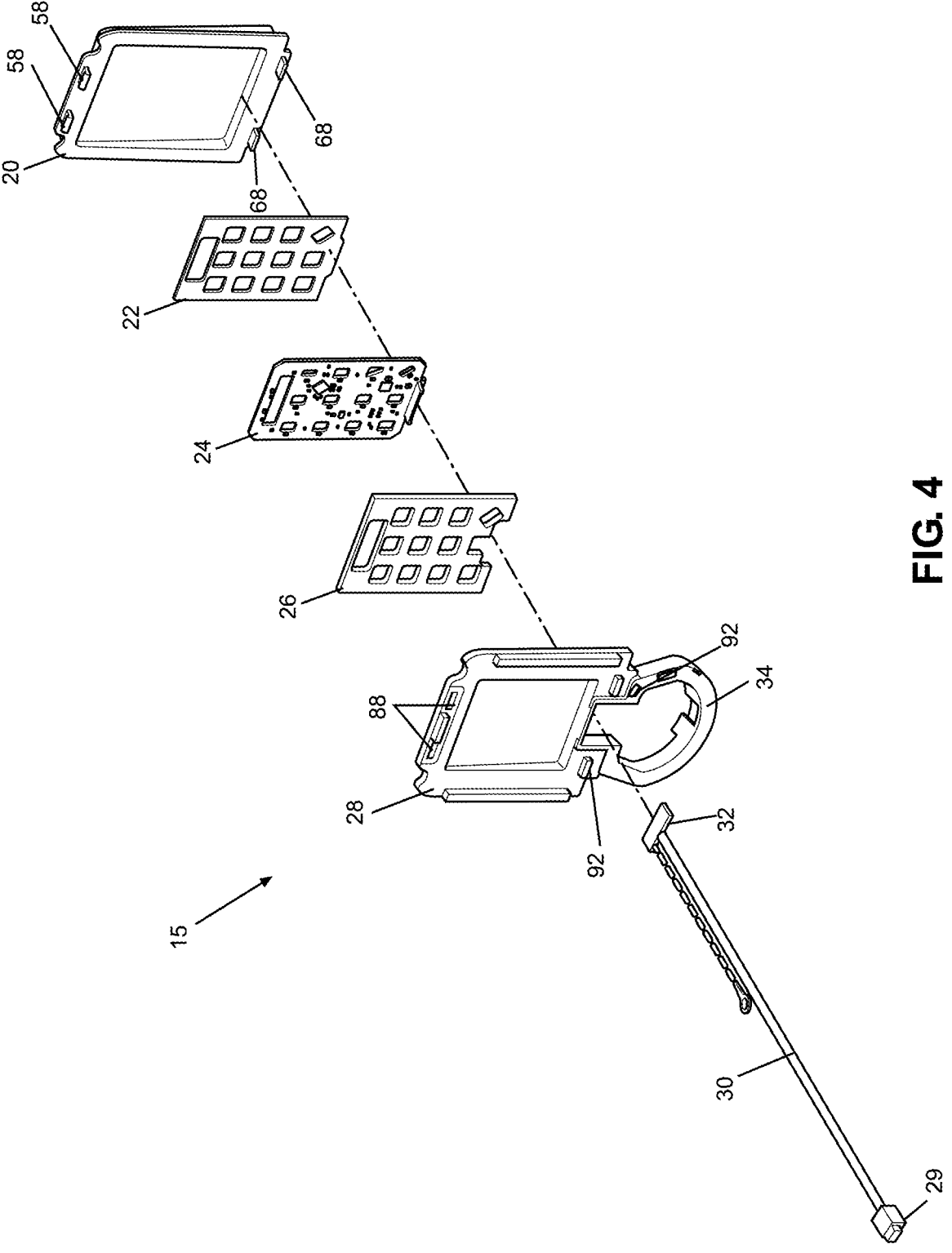
FIG. 4 illustrates a rear exploded perspective view of the touchscreen assembly of FIG. 2.
Figure 8:
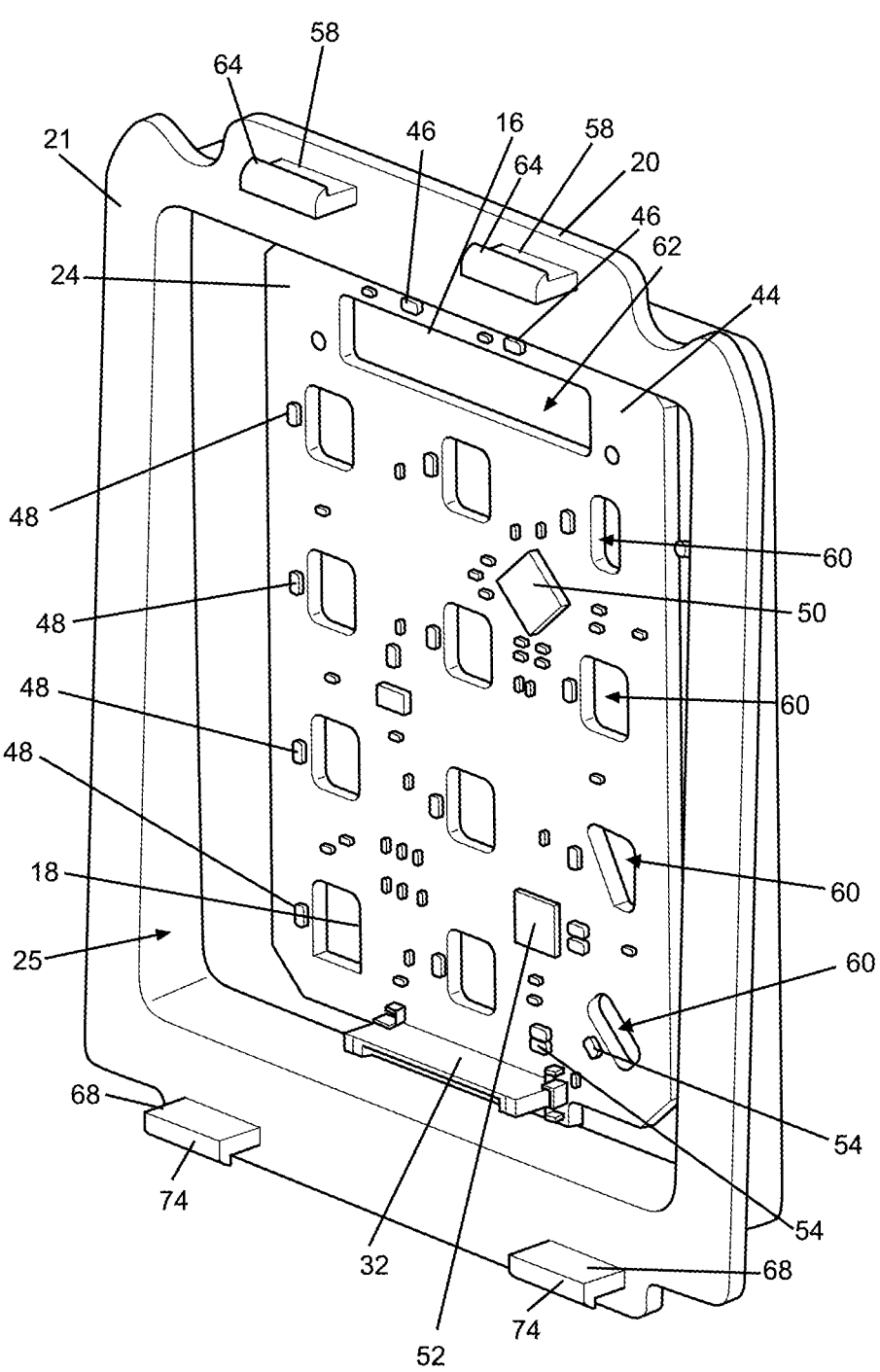
FIG. 8 illustrates a rear perspective view of a portion of the touchscreen assembly of FIG. 2.

Referring to FIGS. 2-4, the touchscreen assembly 15 is shown, according to some embodiments. The touchscreen assembly 15 includes a touchscreen 20 coupled to a support structure 28, with a PCBA 24 and a light isolator 26 positioned therebetween. As best shown in FIG. 8, the touchscreen 20 includes an internal perimeter face 21 positioned on an interior side of the touchscreen 20 (e.g., opposite front surface 5) and an interior cavity 25 structured to at least partially receive the components of the touchscreen assembly 15. The PCBA 24 is positioned within the interior cavity 25 such that a front face 40 of the PCBA 24 is coupled to a backside of the touchscreen 20 using an adhesive 22 (as shown in FIG. 8). In this embodiment, the adhesive 22 is double sided (e.g., a double coated tape with a thin polyester film). The touchscreen 20 includes one or more fasteners 58, 68 (e.g., clips, snaps) positioned at the internal perimeter face 21 thereof to couple with apertures 88, 92 formed proximate a perimeter of the support structure 28. The fasteners 58, 68 include protrusions 64, 74 that engage (e.g., interact, mate) with the apertures 88, 92 on the support structure 28.

Referring to FIGS. 2-4, the touchscreen assembly 15 also includes a wiring harness 30 having a first electrical connector 32 and a second electrical connector 29. The wiring harness 30 electrically connects the exterior assembly 12 of the lock assembly 10 to the interior assembly 2 through a door. Specifically, the touchscreen 20 is electrically connected to the interior assembly 2 by the wiring harness 30 (e.g., first electrical connector 32 is connected to the touchscreen assembly 15 and second electrical connector 29 is connected to the interior assembly 2, including any control circuitry/processing unit). In some embodiments, one of the first electrical connector 32 or the second electrical connector 29 is a soldered connection to either the touchscreen assembly 15 or the interior assembly 2 respectively. For example, the first electrical connector 32 may be soldered to the PCBA 24.

In some embodiments, the support structure 28 includes a main portion 37 and an integrated loop 34 with an opening 39. The main portion 37 and the integrated loop 34 are integrally formed as part of the support structure 28. In other embodiments, the main portion 37 and the integrated loop 34 are separately formed components coupled together to form the support structure 28. In the illustrated example, the support structure 28 is made from a poly carbonate material (e.g., LG Chem LUPOY PC 1201-15). However, the support structure may be made from other materials, for example, a variety of injection molded plastics.

The integrated loop 34 includes an interior wall 33 and an exterior wall 35 forming a wire channel 36 therebetween. The wire channel 36 includes one or more tabs 38 that extend into the wire channel 36 from the interior and exterior walls 33, 35. The tabs 38 are structured to retain wires within the wire channel 36 by compressing a wire between opposing tabs 38. In some embodiments, the integrated loop 34 also includes other types of tabs 42 to aid in the retention of the wires when positioned within the wire channel 36. When assembled with the lock assembly 10, the integrated loop 34 of the support structure 28 surrounds the mechanical lock assembly 14 (e.g., and torque blade 1), which may extend at least partially through opening 39. The opening 39 may further extend into the main portion 37 of the support structure 28 at an extended opening 31, through which at least a portion of the wiring harness 30 or the first electrical connector 32 may extend. The support structure 28 is further described with regard to FIGS. 11-12 below.

Figures 5, 6, 7:
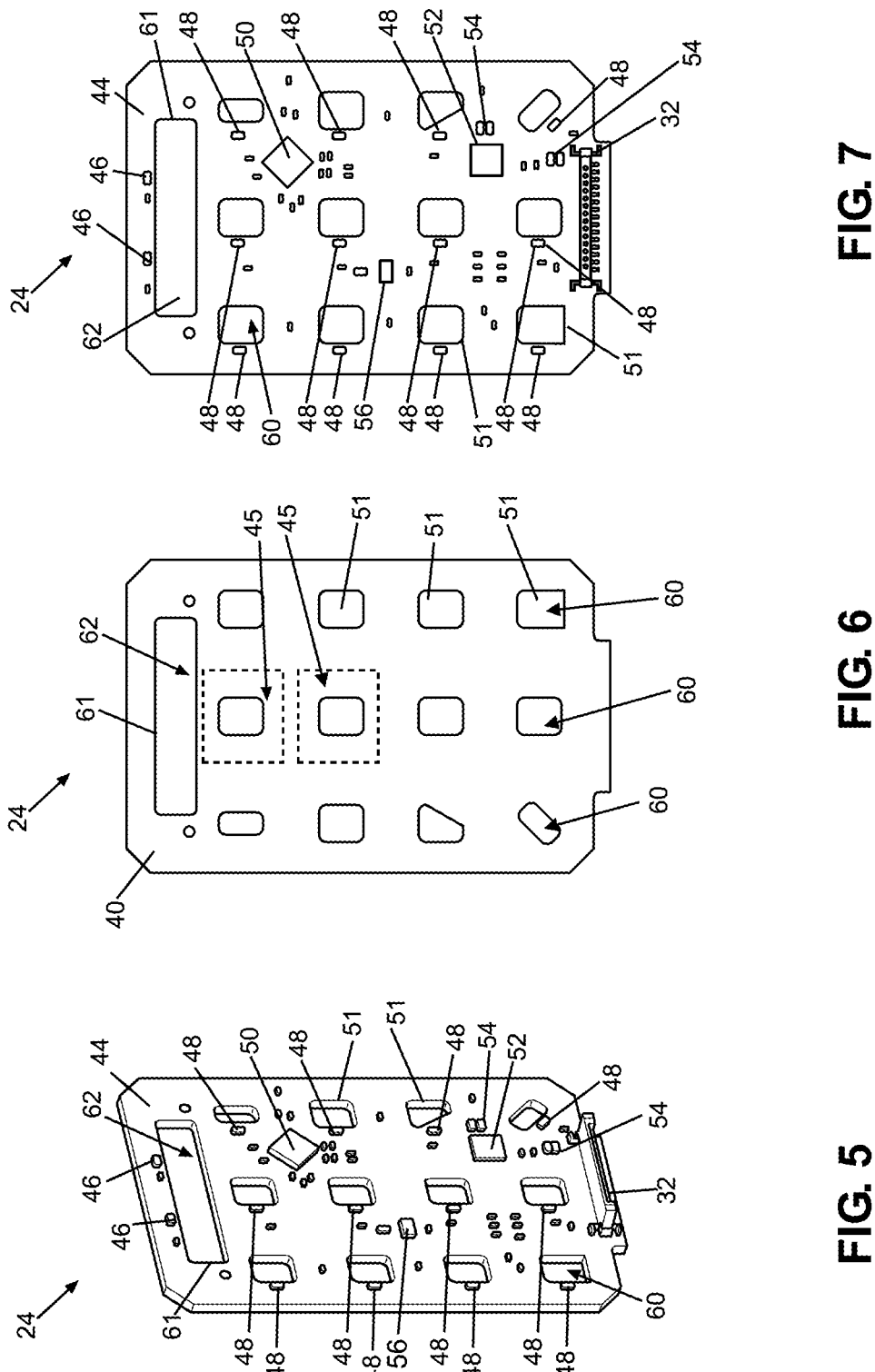
FIG. 5 illustrates a perspective view of a printed circuit board assembly (PCBA) of the touchscreen assembly of FIG. 2.
FIG. 6 illustrates a front view of the PCBA of FIG. 5.
FIG. 7 illustrates a rear view of the PCBA of FIG. 5.

Referring now to FIGS. 5-7, the PCBA 24 for use with the touchscreen assembly 15 is shown, according to an example embodiment. The PCBA 24 includes a front face 40 and a rear face 44. The PCBA 24 can include a variety of components, including, but not limited to, a touch integrated circuit 50, a general-purpose input/output expander 52, capacitors 54, and a metal-oxide-semiconductor field-effect transistor (MOSFET) 56, all positioned on the rear face 44.

The front face 40 is substantially flat across the surface and includes one or more input regions 45 having sensors formed as capacitance touch traces. The input regions 45 are formed substantially in line with the icons 18 formed on the front surface 5 of the touchscreen 20. In this way, when a user presses or touches the region around an icon 18, the touch is sensed within the corresponding input region 45 for that icon 18 (e.g., capacitance change is detected). Although only two input regions 45 are illustrated in FIG. 6 for example purposes, multiple other input regions 45 are included (e.g., an input region 45 for each icon 18).

The PCBA 24 includes one or more window cut-outs 51 forming icon windows 60 (e.g., apertures, channels) and one or more logo cut-outs 61 forming a logo window 62. The icon windows 60 are positioned such that when the touchscreen assembly 15 is assembled, the icon windows 60 are in line with the icons 18 on the touchscreen 20 (e.g., each icon 18 is positioned entirely within an icon window 60 when viewed from the front surface 5 of touchscreen 20) as shown in FIG. 2. The logo window 62 is positioned such that when the touchscreen assembly 15 is assembled, the logo window 62 is in line with the logo 16 on the touchscreen 20 (e.g., the logo 16 is positioned entirely within the logo window 62 when viewed from the front surface 5 of touchscreen 20) as shown in FIG. 2.

The PCBA 24 includes a light emitter 48 (e.g., a light-emitting diode (LED)) positioned proximate (e.g., adjacent, to the side of) each icon window 60 on the rear face 44. Accordingly, each icon window 60 and icon 18 has a corresponding light emitter 48. The PCBA 24 also includes at least one light emitter 46 (e.g., an LED) positioned proximate the logo window 62 on the rear face 44. In some embodiments, there are no light emitters proximate the logo window 62. Each light emitter 46, 48 produces light from the rear face 44 of the PCBA 24 which is directed toward and reflects off the support structure 28 (e.g., within icon cavities 82 and a logo cavity 86 as described further herein) and back through the front surface 5 of the touchscreen 20, thereby lighting up the transparent portions of the front surface 5, including the icons 18 and logo 16.

Referring to FIG. 8, the PCBA 24 is coupled to the inside of the touchscreen 20 (e.g., using adhesive 22). As illustrated, the logo window 62 is aligned with the logo 16 on the touchscreen 20 such that the logo 16 is positioned within the logo window 62. The icons 18 are similarly positioned within each respective icon window 60.

Figure 9:
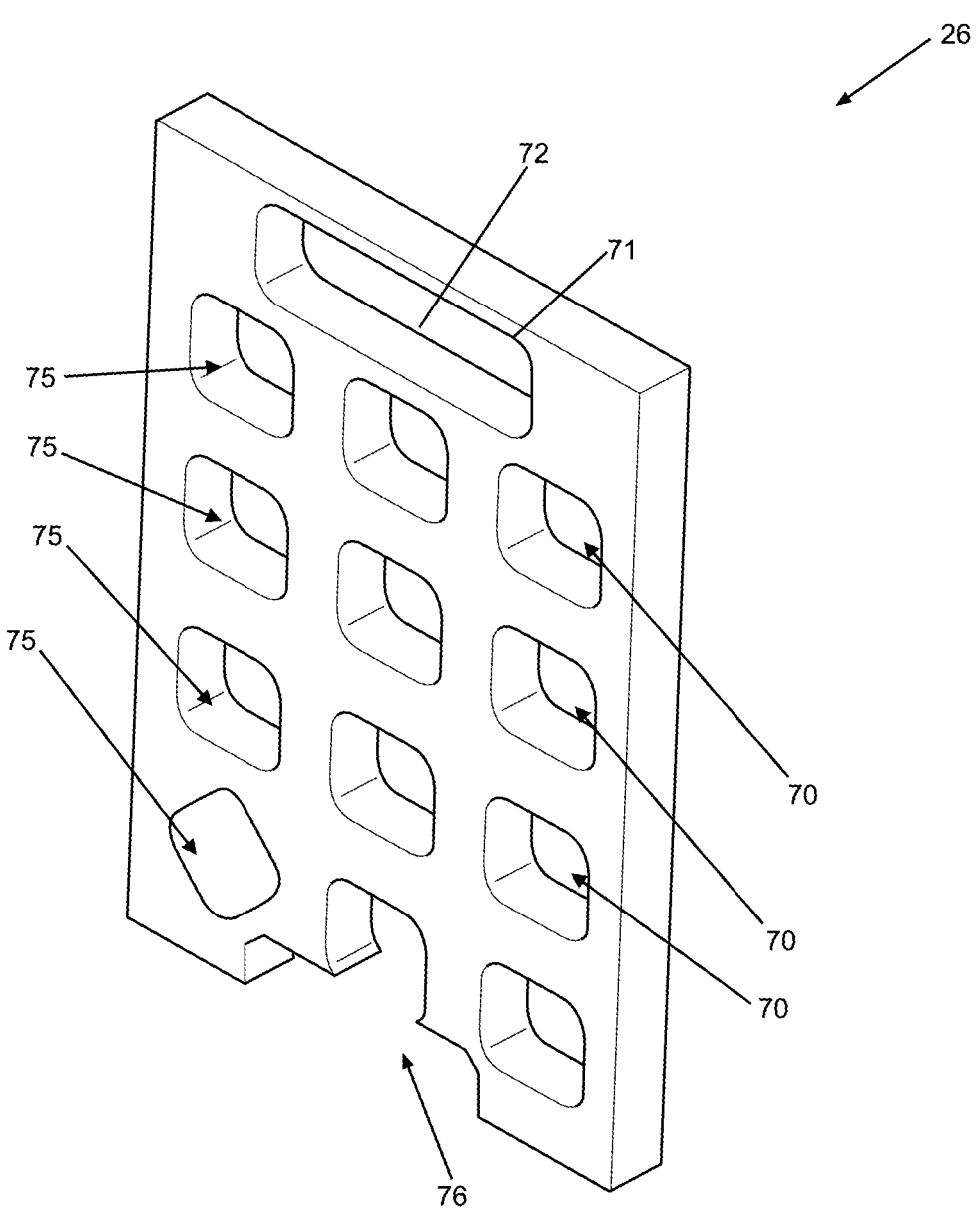
FIG. 9 illustrates a perspective view of a light isolator of the touchscreen assembly of FIG. 2.
Figure 10:
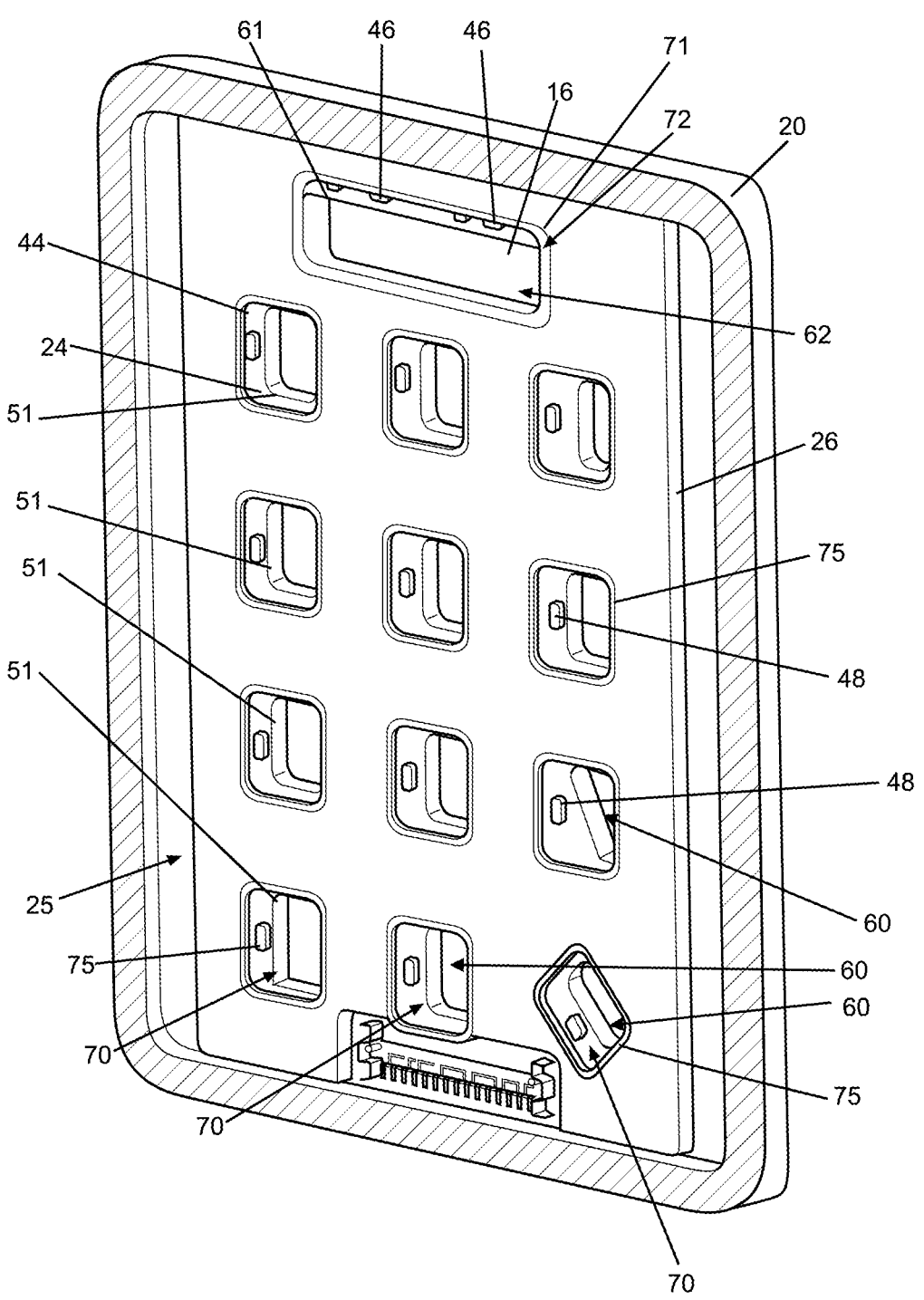
FIG. 10 illustrates a rear perspective view of a portion of the touchscreen assembly of FIG. 2.

Referring to FIG. 9, the light isolator 26 is shown, according to an example embodiment. Although illustrated herein, the touchscreen assembly 15 may or may not include a light isolator (e.g., light isolators 26, 126, 226, 326). In some embodiments, the touchscreen assembly 15 is formed without a light isolator. The light isolator 26 includes light isolator icon cut-outs 75 forming multiple light isolator icon windows 70 and at least one light isolator logo cut-out 71 forming at least one light isolator logo window 72. Light isolator icon windows 70 and light isolator logo window 72 may also be referred to herein as "light channels." Similar to the arrangement of the windows formed as part of the PCBA 24, the light isolator icon window 70 and light isolator logo window 72 are aligned with the icons 18 and logo 16 when assembled as part of the touchscreen assembly 15 (as shown in FIGS. 2 and 10). In this way, the icons 18 and logo 16 are positioned entirely within the respective windows 70, 72 (e.g., the icons 18 and logo 16 are positioned entirely within the light isolator icon window 70 and light isolator logo window 72 when viewed from the front surface 5 of touchscreen 20). The light isolator 26 also includes an inset portion 76 positioned proximate a bottom edge through which the first electrical connector 32 and/or the wiring harness 30 extends when assembled.

In the illustrated embodiment in FIGS. 9-10, the light isolator 26 is made of a foam material, for example, a low density closed-cell ethylene propylene diene monomer (EPDM) foam. In other embodiments, as described further herein, the light isolator may be made from other materials. The light isolator 26 is opaque (e.g., except for light channels formed therethrough) and structured to restrict light from bleeding through. The light isolator 26 also acts to provide support and cushion to the touchscreen assembly 15. As the light isolator 26 is positioned between the PCBA 24 and the support structure 28, the light isolator 26 provides support and allows all components to be snugly fit within the touchscreen assembly 15 while limiting movement of such components.

In some embodiments, the light isolator 26 may be formed as part of (e.g., over-molded onto) the support structure 28. In this embodiment, the light isolator 26 may be formed as an extension of each icon perimeter wall 80 and logo perimeter wall 84 of the support structure 28 (further described herein). Instead of a light isolator 26 as shown and described herein, multiple smaller light isolators (e.g., pieces of foam or silicone) may be formed as part of (e.g., over-molded onto) and surrounding each of the icon perimeter walls 80, logo perimeter wall 84 of the support structure 28. In this way, for each icon perimeter wall 80 and logo perimeter wall 84, a light channel is formed (e.g., within each light isolator). Accordingly, the light isolator 26 may extend from the support structure 28 to the PCBA 24 and creates a channel thereby preventing light from bleeding between channels and/or cavities within the touchscreen assembly 15.

Referring to FIG. 10, each light emitter 48 of the PCBA 24 is positioned within a corresponding light isolator icon window 70 (e.g., light channel). In addition, the light emitter 46 associated with the logo 16 is positioned within the light isolator logo window 72 (e.g., light channel). Accordingly, each light emitter 46, 48 is isolated from each other within channels formed by the light isolator icon window 70 and light isolator logo window 72 to limit the amount of light bleeding from each channel. Each of the icon windows 60 and logo window 62 of the PCBA 24 are also positioned within corresponding light isolator icon window 70 and light isolator logo window 72. Accordingly, each icon 18 is positioned aligned with (e.g., within) each respective icon window 60 and light isolator icon window 70. In addition, the logo 16 is positioned aligned with (e.g., within) the logo window 62 and light isolator logo window 72. The light isolator icon windows 70 and light isolator logo window 72 form light channels through which light from light emitters 46, 48 can travel, while the remainder of the light isolator 26 blocks the light. Accordingly, any light transmitted from the light emitters 46, 48 of the PCBA 24 is concentrated within and directed through the light channels designated for each icon 18 and logo 16, thereby creating brighter, clearer light through the transparent portions of the front surface 5 of the touchscreen 20.

Figure 11:
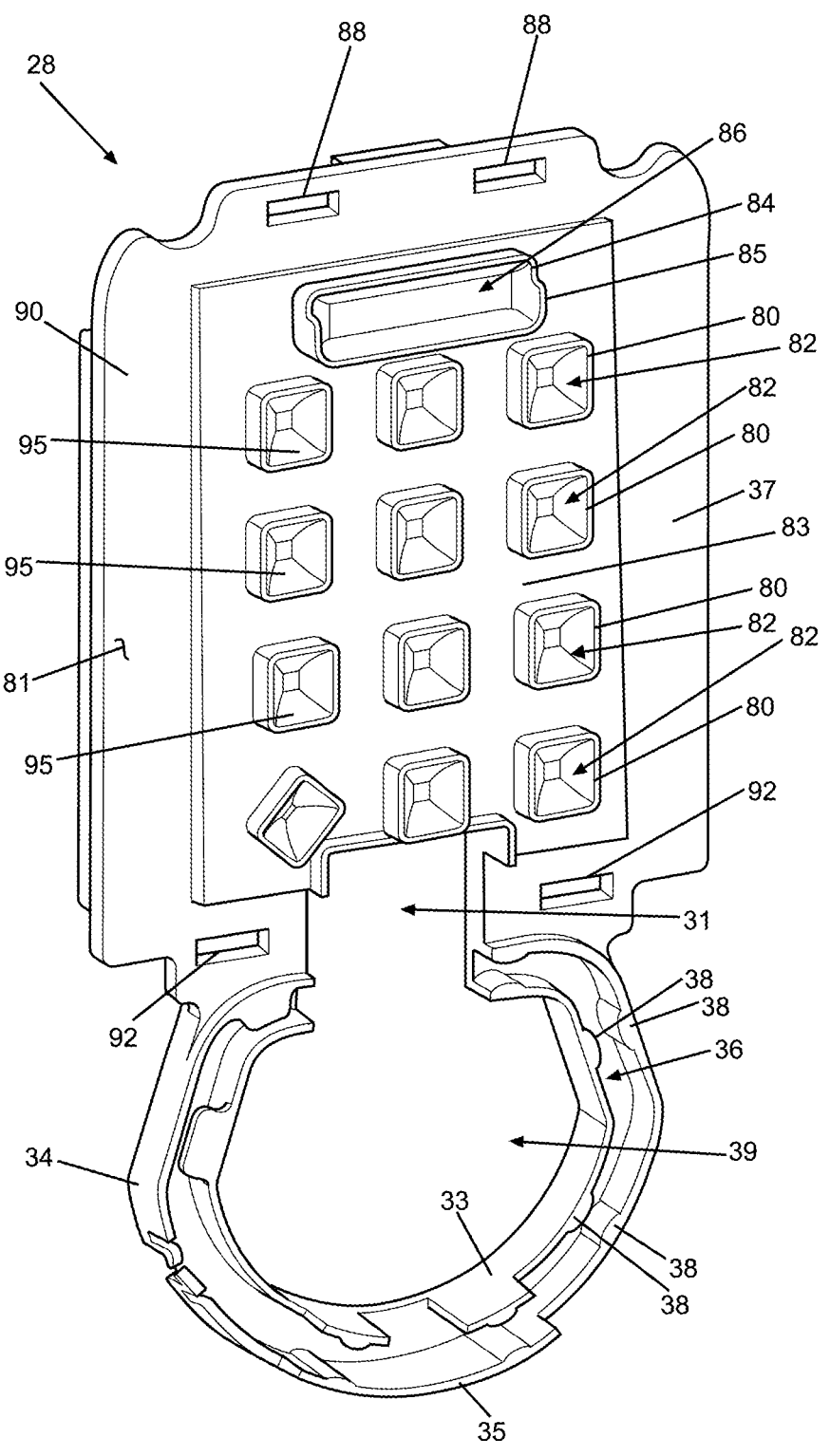
FIG. 11 illustrates a front perspective view of a support structure of the touchscreen assembly of FIG. 2.
Figure 12:
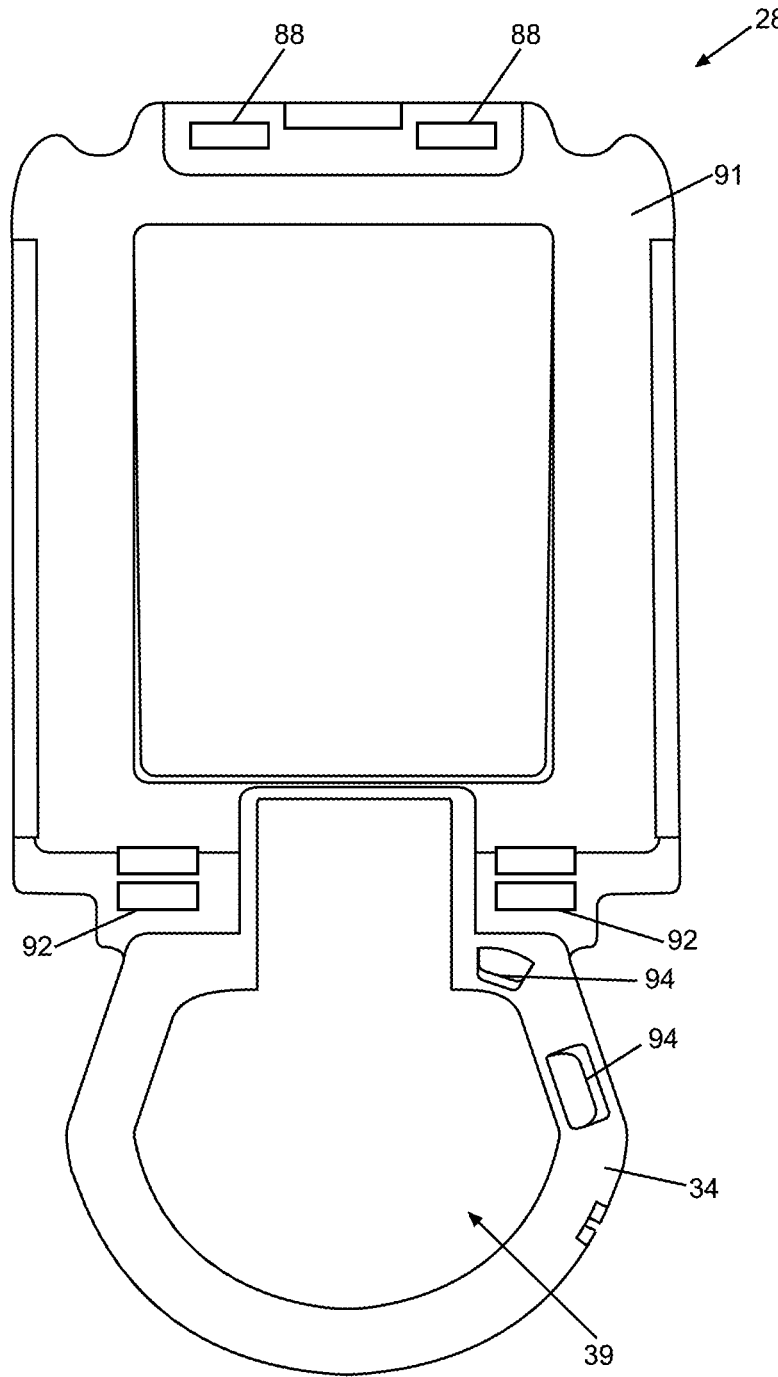
FIG. 12 illustrates a rear view of the support structure of FIG. 11.

Referring now to FIGS. 11-12, the support structure 28 is illustrated, according to some embodiments. A front surface 90 of the support structure 28 is shown in FIG. 11, and a rear surface 91 of the support structure 28 is shown in FIG. 12. As described above, the support structure 28 includes a main portion 37 and an integrated loop 34. The main portion 37 and integrated loop 34 are integrally formed as part of the support structure 28. In other embodiments, the main portion 37 and integrated loop 34 are separately formed components coupled together to form the support structure 28. In some embodiments, as discussed further herein, the support struc-ture 28 does not include the integrated loop 34.

The main portion 37 includes a perimeter face 81 and a center portion 83. The perimeter face 81 includes top apertures 88 and bottom apertures 92 extending there-through. When assembled with the touchscreen 20, the apertures 88, 92 mate (e.g., clip, snap, engage, couple) with corresponding fasteners 58, 68 (e.g., with protrusions 64, 74 of fasteners 58, 68) of the touchscreen 20. As such, when assembled, the perimeter face 81 of the support structure 28 substantially abuts the internal perimeter face 21 of the touchscreen 20.

Figure 14:
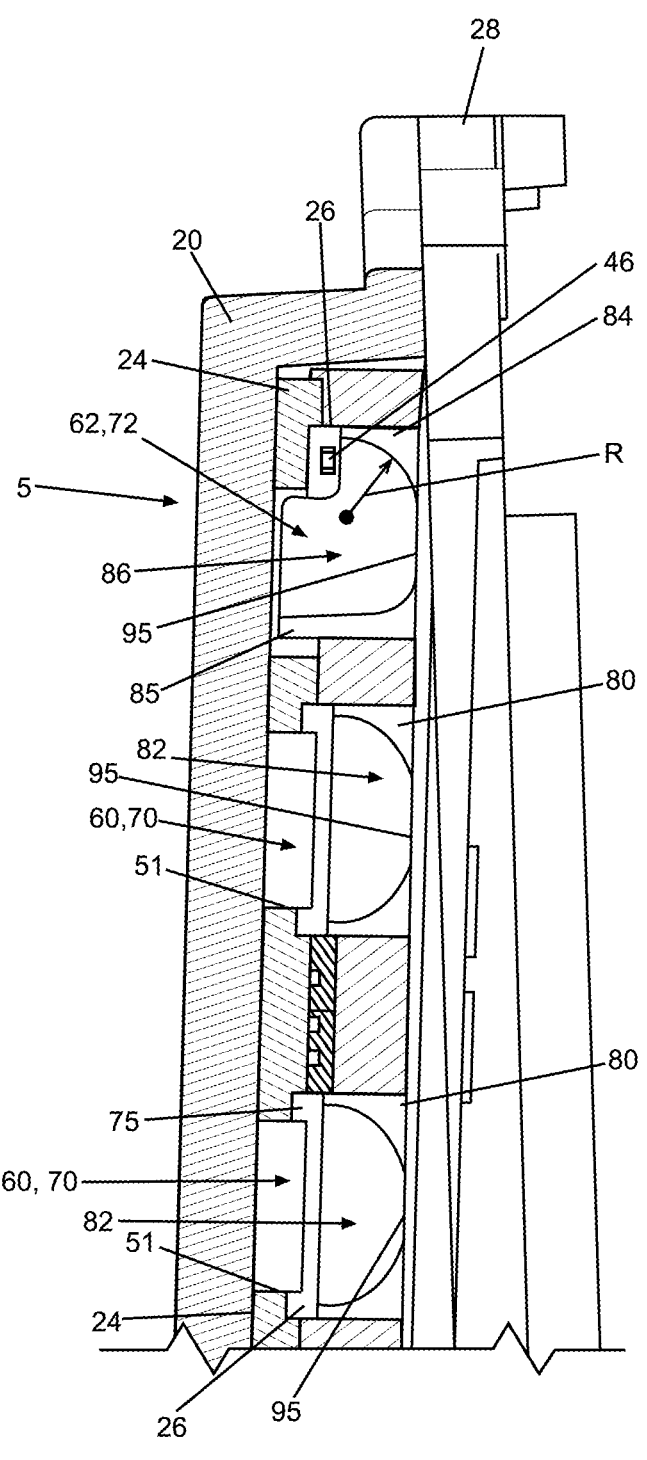
FIG. 14 illustrates a section view of the touchscreen assembly of FIG. 2 along section line 14-14.

Referring to FIGS. 11 and 14, the support structure 28 includes a logo cavity 86 formed by a logo perimeter wall 84 having an extended lip 85. In this illustrated embodiment, the logo cavity 86 is substantially rectangular in shape. However, the logo cavity 86 can be a variety of shapes. The support structure 28 also includes one or more icon cavities 82 distributed across the center portion 83, each formed by an icon perimeter wall 80. In the illustrated embodiment, the icon cavities 82 are square and triangular in shape. However, the icon cavities 82 can be a variety of shapes. In some embodiments, when assembled with the touchscreen assem-bly 15, each icon perimeter wall 80 extends through the light isolator 26 and at least partially through the window cut-outs 51 on the PCBA 24, thereby forming a light guide. In this way, the light from each light channel (e.g., emitted from each light emitter 48) is prevented from bleeding into other light channels or cavities. In some embodiments, each icon perimeter wall 80 extends at least partially through the light isolator icon cut-outs 75 of the light isolator 26. In some embodiments, each icon perimeter wall 80 extends entirely through the light isolator 26 and the PCBA 24.

Each icon cavity 82 includes an inner curvature surface 95 defining at least a portion of the cavity. The curvature surface 95 may be specifically sized and shaped to optimally receive and reflect light back through the touchscreen 20. For example, a specific radius R (as shown in FIG. 14) may be chosen to reflect the light back toward and through the touchscreen 20 at a specific angle.

Figure 13:
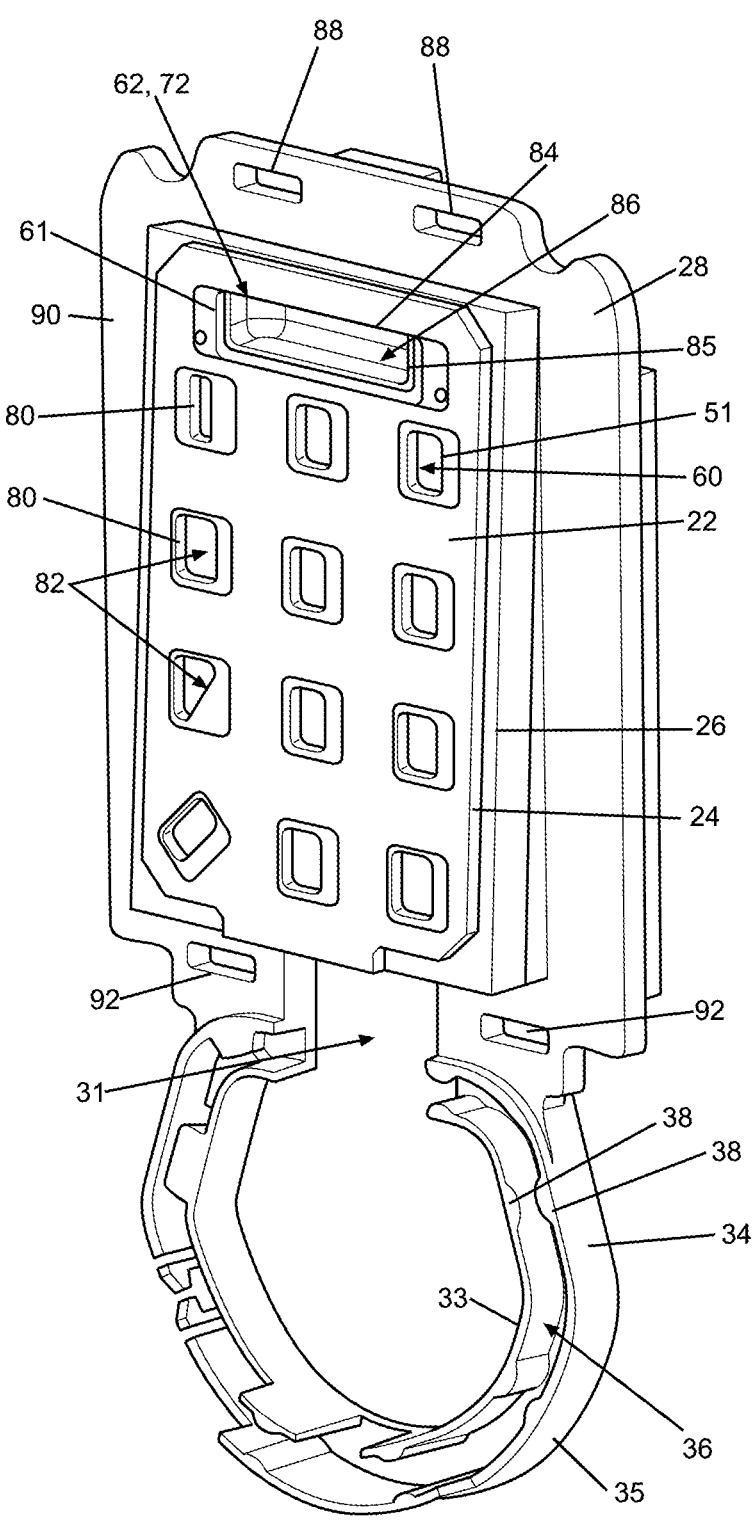
FIG. 13 illustrates a front perspective view of a portion of the touchscreen assembly of FIG. 2.

Referring to FIGS. 11-14, the extended lip 85 of the support structure 28 is an extended portion of the bottom edge of the logo perimeter wall 84. Referring to FIGS. 13-14, when the support structure 28 is assembled with the touchscreen assembly 15, the extended lip 85 extends through the logo window 62 of the PCBA 24 and the light isolator logo window 72. The extended lip 85 covers the internal components of the touchscreen assembly 15 and prevents a user from being able to see the PCBA 24 or light isolator 26 of the touchscreen assembly 15 through the front surface 5 (e.g., through the logo 16) of the touchscreen 20. The extended lip 85 may also form a part of the light channel and/or light cavity such that the light is prevented from bleeding into other channels within the touchscreen assem-bly 15. The extended lip 85 may also provide some addi-tional support to the touchscreen assembly 15. In some embodiments, an extended lip similar to extended lip 85 may be formed as part of each icon perimeter wall 80 and may extend through the light isolator icon cut-outs 75 of the light isolator 26 and/or the window cut-outs 51 of the PCBA 24. The extended lips formed as part of each icon perimeter wall 80 further prevents light from bleeding into other channels within the touchscreen assembly 15.

As illustrated in FIG. 14, with the touchscreen assembly 15 assembled, the icon cavities 82 are aligned within the icon windows 60 of the PCBA 24 and light isolator icon windows 70 of the light isolator 26. Similarly, the logo cavity 86 is aligned with the logo window 62 of the PCBA and the light isolator logo window 72 of the light isolator 26.

Figure 15:
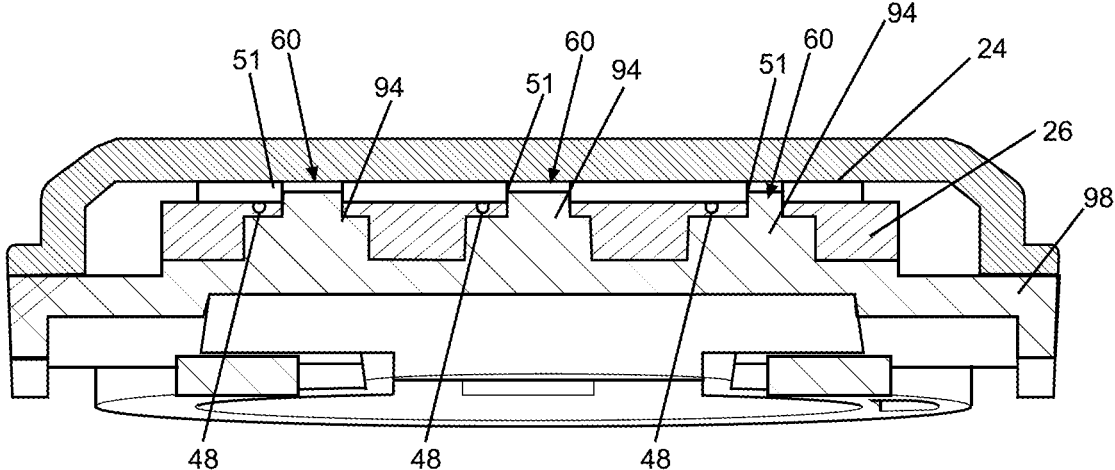
FIG. 15 illustrates a section view of a touchscreen assembly, according to another embodiment.
Figure 16:
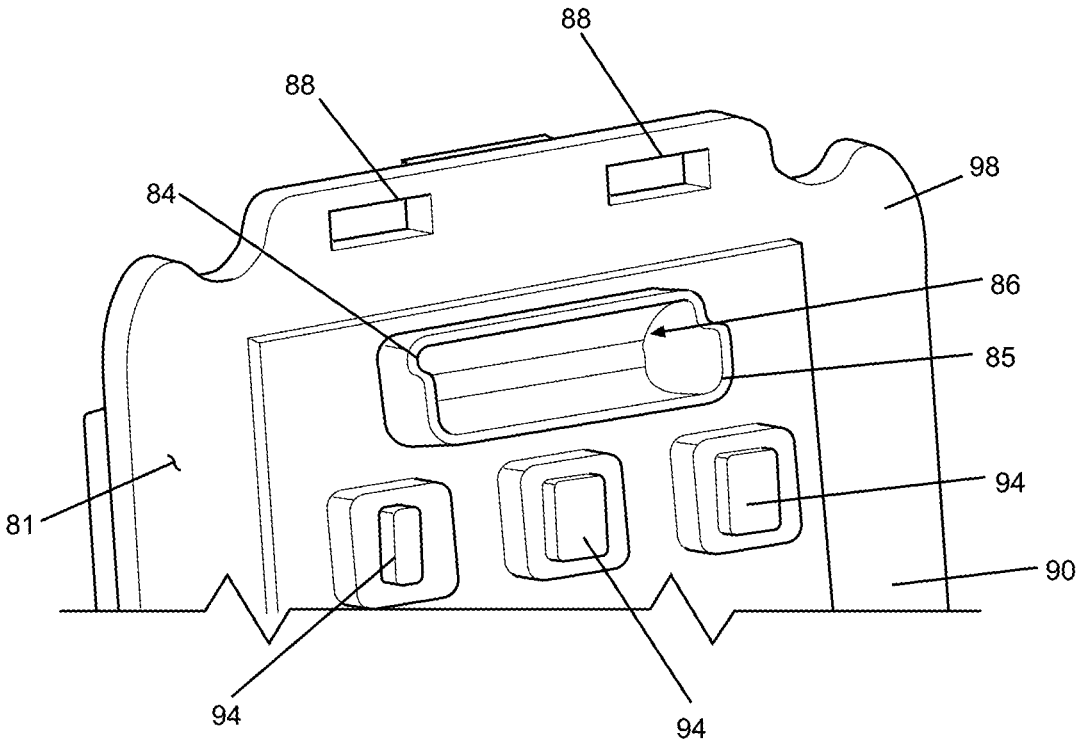
FIG. 16 illustrates a front view of the support structure of the touchscreen assembly of FIG. 15.
Figure 17:
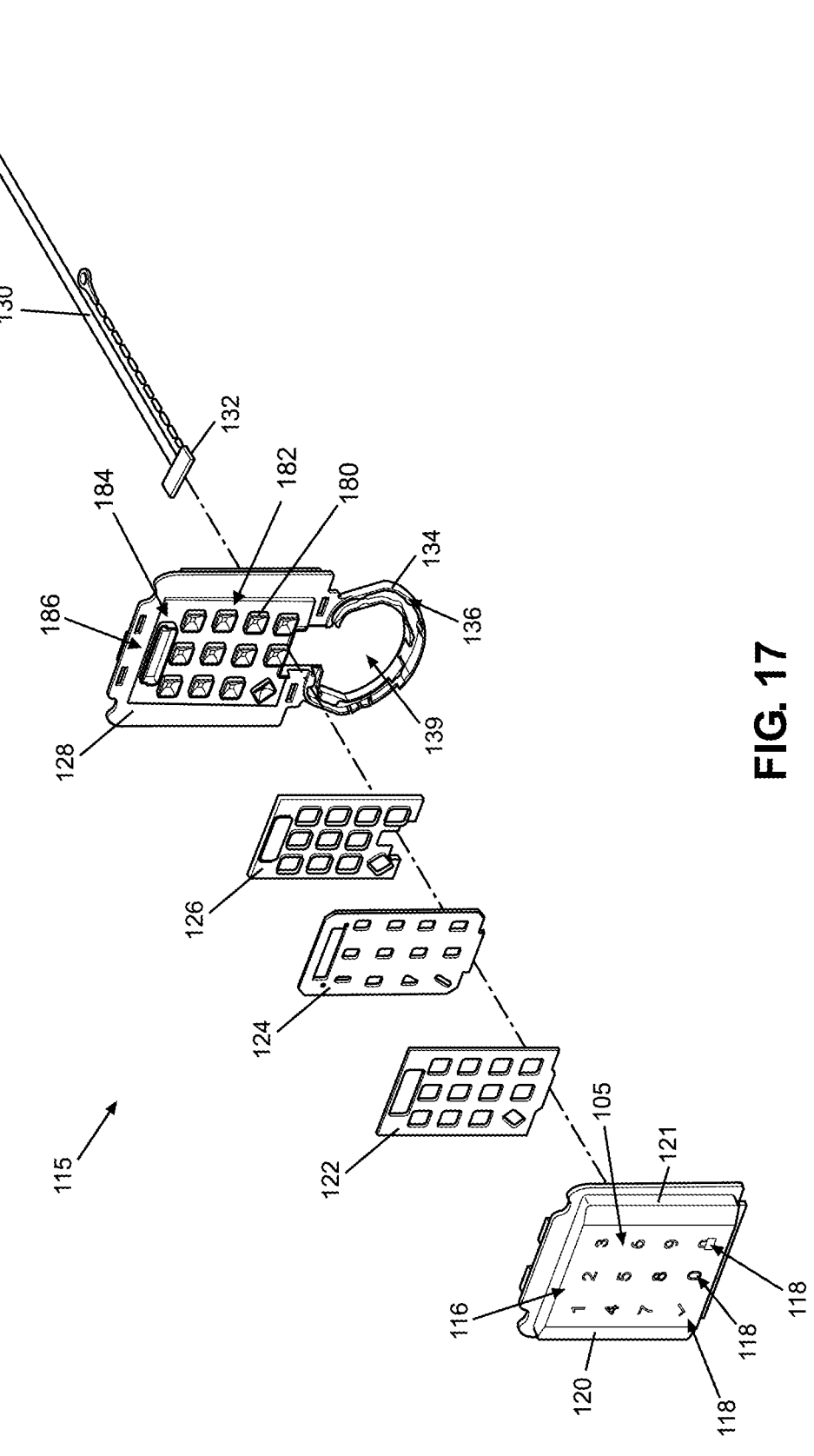
FIG. 17 illustrates a perspective exploded view of a touchscreen assembly, according to another embodiment.
Figures 18, 19, 20:
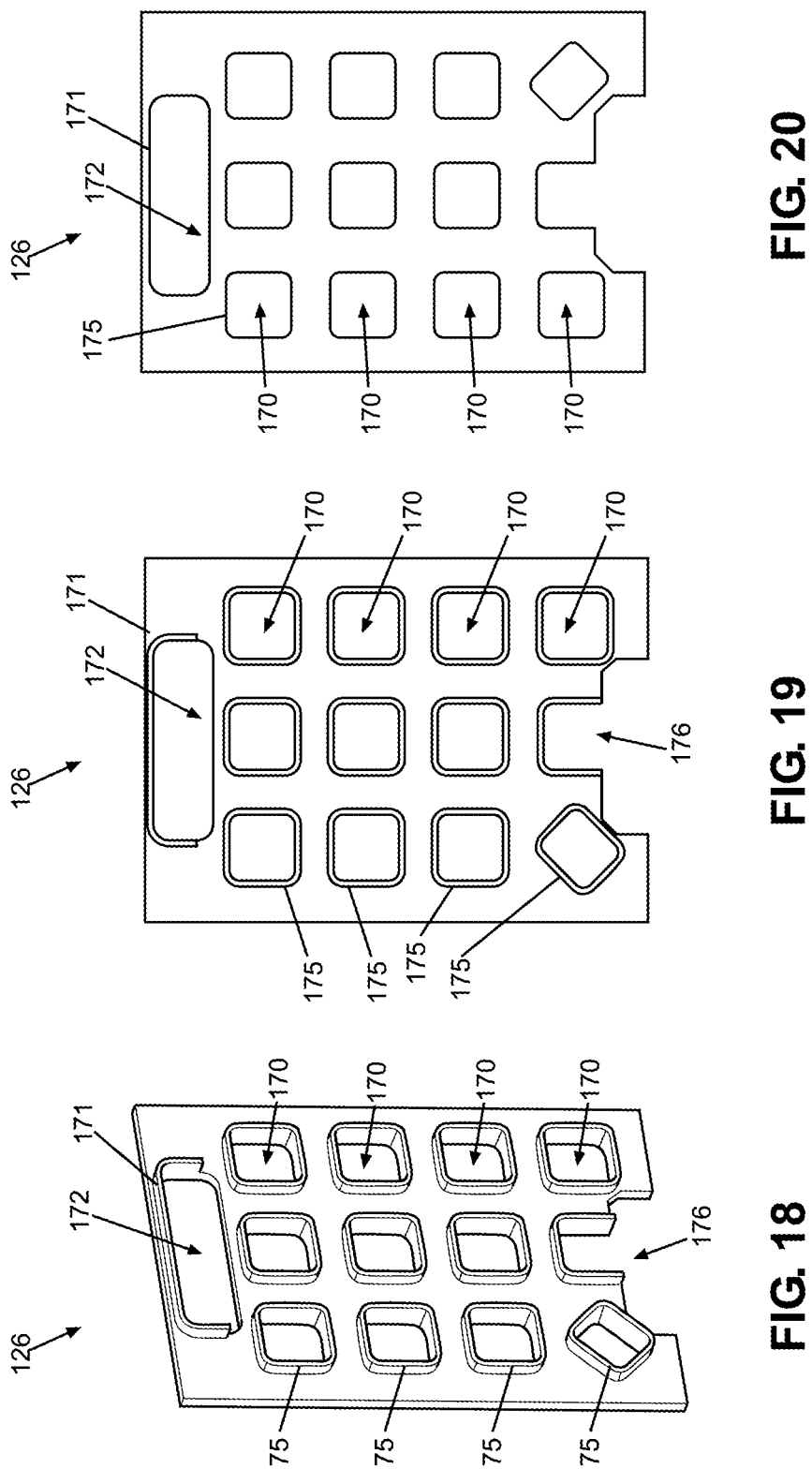
FIG. 18 illustrates a perspective view of a light isolator of the touchscreen assembly of FIG. 15, according to some embodiments.
FIG. 19 illustrates a front view of a light isolator of the touchscreen assembly of FIG. 15, according to some embodiments.
FIG. 20 illustrates a rear view of a light isolator of the touchscreen assembly of FIG. 15, according to some embodiments.
Figure 21:
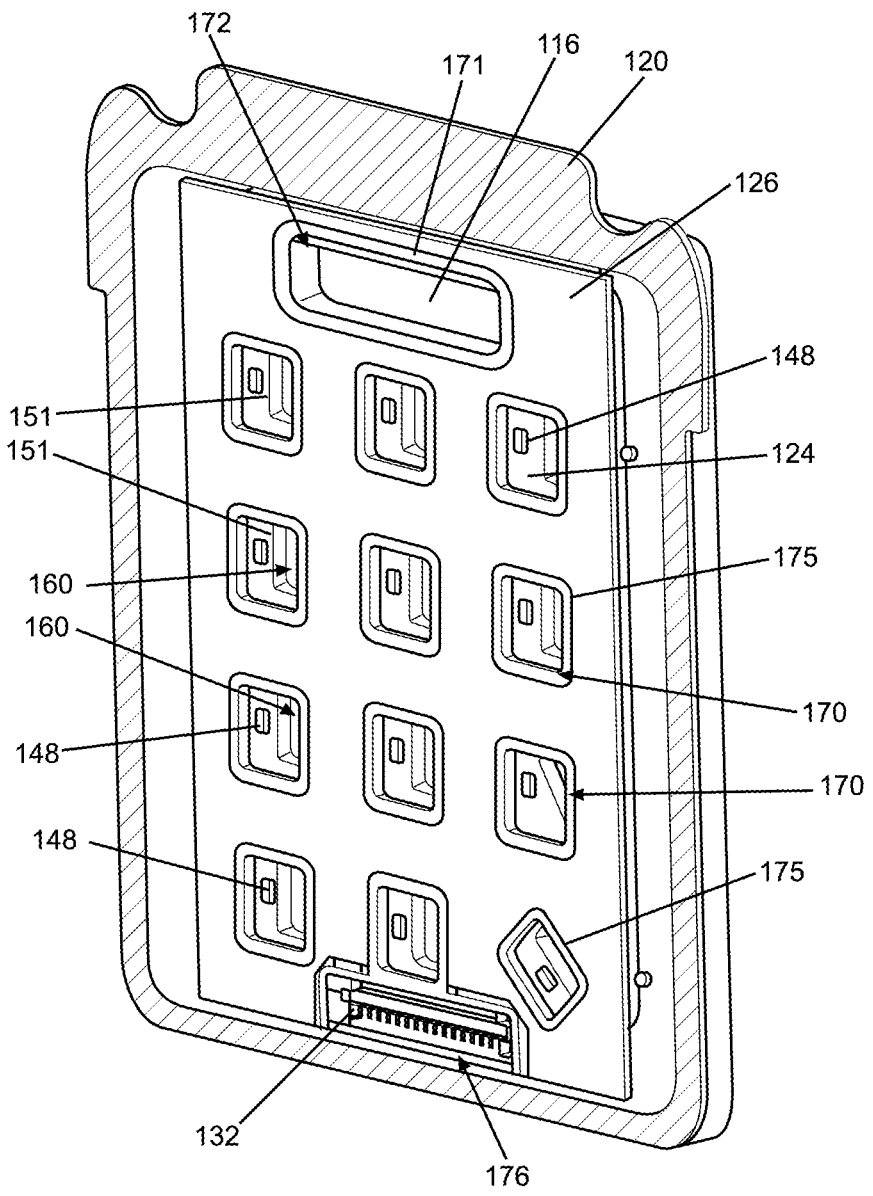
FIG. 21 illustrates a perspective view of a portion of the touchscreen assembly of FIG. 15.

Referring now to FIGS. 15-16, a support structure 98 according to another embodiment is illustrated. In some embodiments, the support structure 98 is used as part of touchscreen assembly 15 instead of support structure 28. The support structure 98 includes one or more light guides 94 formed as part of the front surface 90. As illustrated, the light guides 94 extend from the front surface 90, toward the touchscreen 20, and at least partially through the light isolator 26 and the PCBA 24. In some embodiments, a light guide 94 is provided for each icon 18 and logo 16 on the touchscreen 20. The light guides 94 receive and reflect light emitted from light emitters 48 positioned on the rear face 44 of the PCBA 24. The light guides 94 reflect the light toward and through the front surface 5 of the touchscreen 20 to illuminate the icons 18 and logo 16. Accordingly, the light emitted from the light emitters 48 is directed toward the light guides 94 and changes direction as it is reflected back toward the touchscreen 20 by the light guides 94 (e.g., light changes direction, light changes direction by approximately 180 degrees).

Referring to FIGS. 17-21, a touchscreen assembly 115 is shown, according to another embodiment. The touchscreen assembly 115 includes a touchscreen 120 coupled to a support structure 128, with a printed circuit board assembly (PCBA) 124 and a light isolator 126 positioned therebetween. The main difference in this example embodiment is that the light isolator 126 is made from a different material than the light isolator 26 shown in FIGS. 9-10. In the illustrated embodiment, the light isolator 126 is made of a silicone material, for example, a closed-cell silicone rubber (e.g., Shin-Etsu CHN-9550-U, HRS 1951U). In other embodiments, as described further herein, the light isolator may be made from other materials. The light isolator 126 is opaque and structured to prevent light from bleeding through.

The light isolator 126 similarly includes light isolator icon cut-outs 175 forming multiple light isolator icon windows 170 and at least one light isolator logo cut-out 171 forming at least one light isolator logo window 172. Similar to the arrangement of the windows formed as part of the PCBA 124, the light isolator icon window 170 and light isolator logo window 172 are aligned with icons 118 and a logo 116 when assembled as part of the touchscreen assembly 115. In this way, the icons 118 and logo 116 are positioned entirely within the respective windows 170, 172. The light isolator 126 also includes an inset portion 176 positioned proximate a bottom edge through which a first connector 132 and/or a wiring harness 130 extends when assembled.

The light isolator icon windows 170 and light isolator logo window 172 form light channels through which light from light emitters 148 can travel, while the remainder of the light isolator 126 blocks the light. Accordingly, any light transmitted from the light emitters 146, 148 of the PCBA 124 is concentrated within and directed through the light channels designated for each icon 118 and logo 116, thereby creating a brighter, clearer light through the transparent portions of the front surface 5 of the touchscreen 120. The light isolator 126 can also provide support and cushion to the touchscreen assembly 115.

In some embodiments, the light isolator 126 can be compressed slightly between components within the assembly. In some embodiments, the light isolator 126 includes collapsible walls (e.g., collapsible at light isolator icon cut-outs 175, light isolator logo cut-out 171). In this way, contact between the light isolator 126 and the PCBA 124 is ensured, while no pressure (or limited pressure) is applied to the PCBA 124. In some embodiments, the light isolator 126 couples to each cavity 182, 186 (e.g., icon perimeter walls 180, logo perimeter wall 184) on the support structure 128. In some embodiments, the light isolator 126 is formed as part of (e.g., over-molded onto) and may extend from each cavity 182, 186 (e.g., icon perimeter walls 180, logo perimeter wall 184) on the support structure 128. In some embodiments, the light isolator 126 (e.g., light isolator icon cut-outs 175) can wrap through and around each of the window cut-outs 151 formed in the PCBA 124 and/or the icon perimeter walls 180 formed in the support structure 128. In any of these embodiments, the light isolator 126 may extend from the support structure 128 to the PCBA 124 and creates a channel thereby preventing light from bleeding between channels and/or cavities within the touchscreen assembly 115. As the light isolator 126 is positioned between the PCBA 124 and the support structure 128, the light isolator 126 provides support and allows all components to be snugly fit within the touchscreen assembly 115 while limiting movement of such components.

Figure 22:
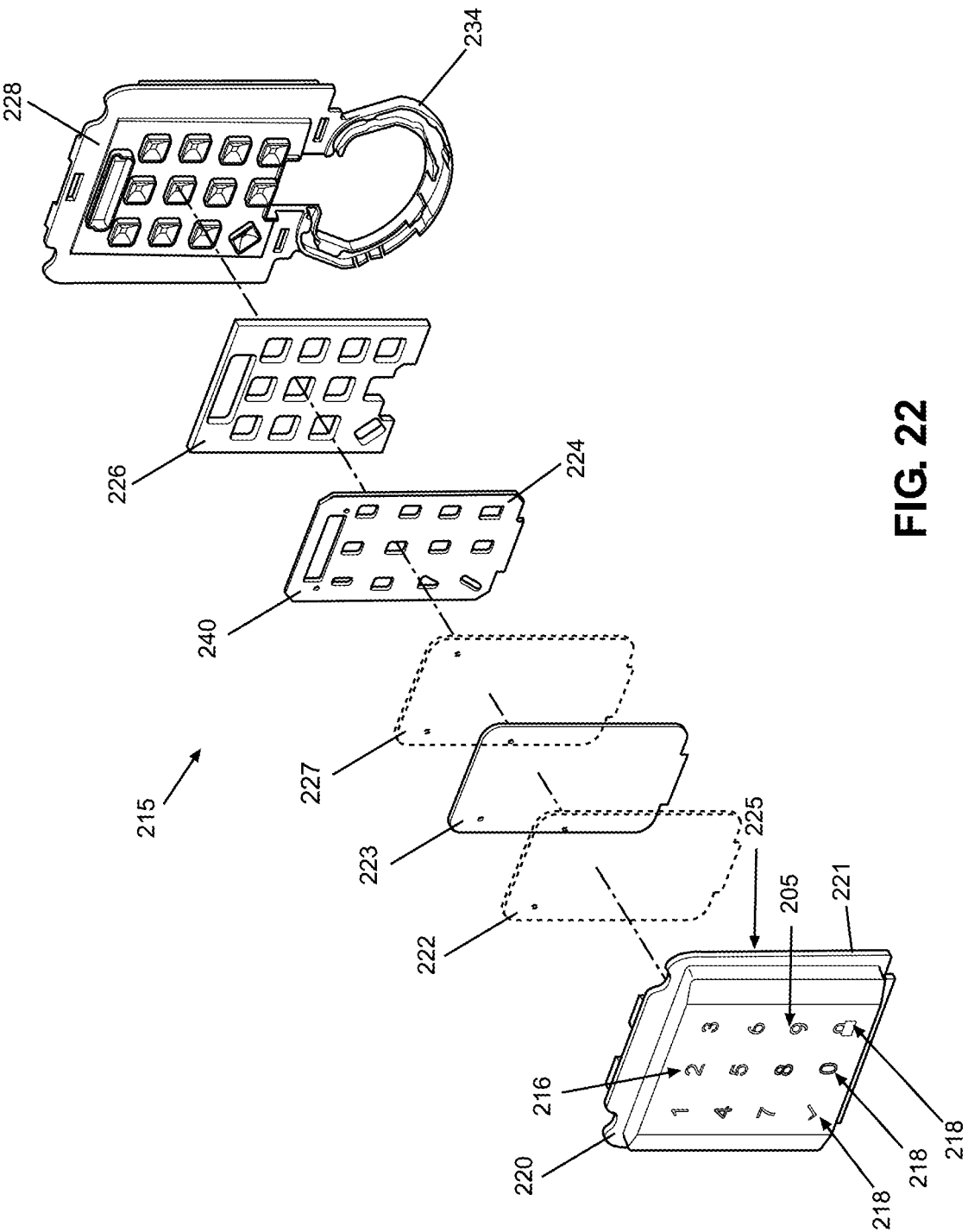
FIG. 22 illustrates a perspective exploded view of a touchscreen assembly, according to another embodiment.

Referring to FIG. 22, a touchscreen assembly 215 is shown, according to another embodiment. The touchscreen assembly 215 includes a touchscreen 220 coupled to a support structure 228, with a printed circuit board assembly (PCBA) 224, a light isolator 226, and a light diffuser 223 positioned therebetween. The touchscreen 220 includes an internal perimeter face 221 positioned on the interior side of the touchscreen 220 (e.g., opposite a front surface 205) and an interior cavity 225 structured to at least partially receive the components of the touchscreen assembly 215. The PCBA 224 and the light diffuser 223 are positioned within the interior cavity 225. A front face 240 of the PCBA 224 is coupled to the light diffuser 223 using an adhesive 227 and the light diffuser 223 is coupled to the backside of the touchscreen 220 using an adhesive 222. In this embodiment, the adhesives 222, 227 are double sided (e.g., double coated tape with a thin polyester film). The adhesives may be the same type of adhesive or different. The light diffuser 223 diffuses the light emitted from light emitters and homogenizes the light to reduce hot spots. The light diffuser 223 may be a film adhered between the PCBA 224 and the backside of the touchscreen 220. In some embodiments (e.g., embodiments described above), the light diffuser 223 is optional.

Figure 23:
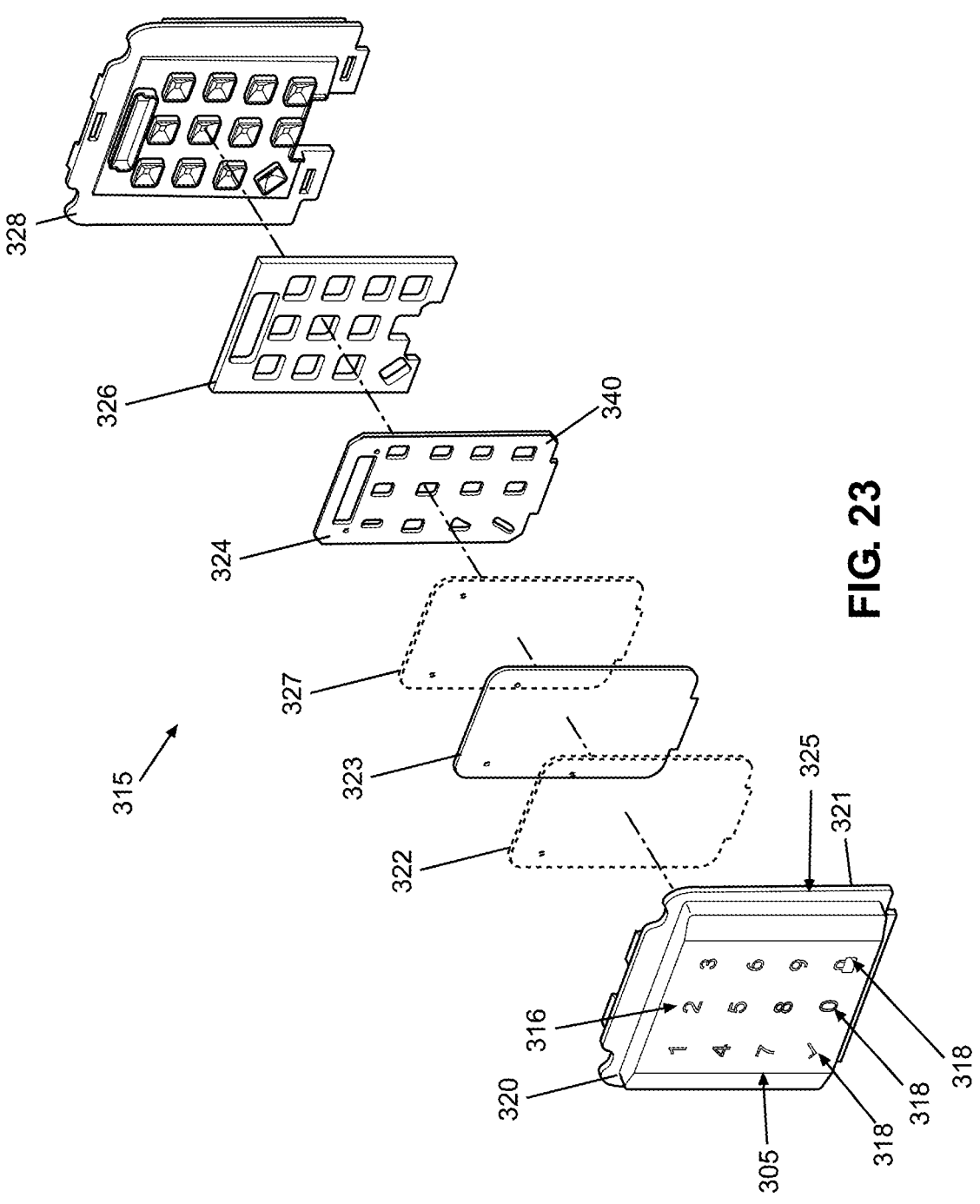
FIG. 23 illustrates a perspective exploded view of a touchscreen assembly, according to another embodiment.

Referring to FIG. 23, a touchscreen assembly 315 is shown, according to another embodiment. The touchscreen assembly 315 includes a touchscreen 320 coupled to a support structure 328, with a printed circuit board assembly (PCBA) 324, a light isolator 326, and a light diffuser 323 positioned therebetween. The support structure 328 of this embodiment does not include an integrated loop as referred to in the above embodiments. Any or all of the embodiments discussed herein may or may not include the integrated loop as part of the support structure.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

What is claimed is:

1. A lock assembly comprising:

an interior assembly and an exterior assembly, the exterior assembly comprising an exterior lock housing and a touchscreen assembly, the touchscreen assembly comprising:

a touchscreen having a plurality of selectable icons on a front surface of the touchscreen;

a printed circuit board assembly (PCBA) comprising:

a plurality of input regions, each input region corresponding to one of the plurality of selectable icons;

a plurality of light emitters positioned on the PCBA; and a plurality of PCBA windows defined through the PCBA, each of the plurality of PCBA windows being positioned adjacent to a corresponding one of the plurality of light emitters; and a support structure facing the plurality of light emitters on the PCBA and on an opposite side of the PCBA than the touchscreen, the support structure having a plurality of icon cavities, each of the plurality of icon cavities configured to reflect light emitted from the plurality of light emitters through the front surface of the touchscreen;

wherein the plurality of icon cavities are aligned with the plurality of PCBA windows such that light reflected by the support structure passes through the PCBA.

2. The lock assembly of claim 1, wherein the PCBA comprises a front surface directed toward the touchscreen and an opposite rear surface directed away from the touchscreen, the plurality of input regions positioned on the front surface of the PCBA and the plurality of light emitters positioned on the rear surface of the PCBA.

3. The lock assembly of claim 2, wherein the plurality of light emitters is configured to emit light toward the support structure and away from the front surface of the PCBA;

wherein the support structure reflects the emitted light back through the front surface of the touchscreen.

4. The lock assembly of claim 1, further comprising a light isolator positioned between the PCBA and the support structure, the light isolator structured to block light.

5. The lock assembly of claim 4, wherein the light isolator comprises a plurality of light isolator windows, each light isolator window forming a light channel within the touchscreen assembly;

wherein each light channel allows light from at least one of the plurality of light emitters to pass therethrough and toward the support structure.

6. The lock assembly of claim 5, wherein each of the plurality of icon cavities comprises an inner surface, each inner surface structured to receive and reflect the emitted light from each of the plurality of light emitters through the light channels.

7. The lock assembly of claim 5, wherein each light isolator window corresponds to one of the plurality of selectable icons and to one of the plurality of light emitters;

wherein each light isolator window is aligned with one of the plurality of selectable icons and with one of the plurality of light emitters in an assembled position of the touchscreen assembly.

8. The lock assembly of claim 7, wherein each PCBA window corresponds with one of the plurality of selectable icons and one of the plurality of light isolator windows;

wherein each PCBA window is aligned with one of the plurality of selectable icons and one of the plurality of light isolator windows in the assembled position of the touchscreen assembly.

9. The lock assembly of claim 1, wherein the plurality of selectable icons comprises transparent portions of the touchscreen and a remainder of the touchscreen is opaque;

wherein light reflected from each of the plurality of light emitters is emitted through respective selectable icons of the plurality of selectable icons.

10. The lock assembly of claim 9, wherein the plurality of selectable icons comprises first transparent portions and the touchscreen further comprises a logo icon comprising a second transparent portion of the touchscreen;

wherein light from at least one of the plurality of light emitters is emitted through the logo icon.

11. The lock assembly of claim 1, wherein the plurality of input regions comprises capacitance touch traces.

12. The lock assembly of claim 1, wherein the support structure comprises a main portion and an integrated loop, the integrated loop comprising:

an interior wall and an exterior wall forming a wire channel; and one or more tabs structured to retain wire within the wire channel.

13. The lock assembly of claim 12, further comprising a mechanical lock assembly having a torque blade, wherein the integrated loop surrounds one of the mechanical lock assembly or the torque blade.

14. The lock assembly of claim 12, wherein the main portion and the integrated loop are integrally formed as part of the support structure.

15. The lock assembly of claim 6, wherein the support structure comprises an upper perimeter wall defining at least one of the plurality of icon cavities, the upper perimeter wall having an extended lip;

wherein the extended lip covers the PCBA from being visible through the front surface of the touchscreen.

16. The lock assembly of claim 1, wherein the plurality of light emitters comprises light-emitting diodes (LEDs).

17. The lock assembly of claim 1, wherein the plurality of icon cavities have a reflective surface for reflecting light from the plurality of light emitters.

18. A touchscreen assembly comprising:

a touchscreen having a plurality of selectable icons on a front surface of the touchscreen;

a printed circuit board assembly (PCBA) comprising:

a plurality of input regions, each input region corresponding to one of the plurality of selectable icons;

a plurality of light emitters positioned on the PCBA; and a plurality of PCBA windows defined through the PCBA, each of the plurality of PCBA windows being positioned adjacent to a corresponding one of the plurality of light emitters; and a support structure facing the plurality of light emitters on the PCBA and on an opposite side of the PCBA than the touchscreen, the support structure having a plurality of icon cavities, each of the plurality of icon cavities structured to reflect light emitted from the plurality of light emitters through the front surface of the touchscreen, the plurality of light emitters positioned between the touchscreen and the support structure;

wherein the plurality of icon cavities is aligned with the plurality of PCBA windows such that light reflected by the support structure passes through the PCBA.

19. The touchscreen assembly of claim 18, further comprising a light isolator positioned between the PCBA and the support structure, the light isolator structured to block light.

20. The touchscreen assembly of claim 19, wherein the light isolator comprises a plurality of light isolator windows, each light isolator window forming a light channel within the touchscreen assembly;

wherein each light channel allows light from one of the plurality of light emitters to pass therethrough and toward the support structure.

21. The touchscreen assembly of claim 20, wherein each of the plurality of icon cavities comprises an inner surface, each inner surface receiving and reflecting light from each of the plurality of light emitters through the light channels.

22. The touchscreen assembly of claim 20, wherein each light isolator window corresponds to one of the plurality of selectable icons and to one of the plurality of light emitters;

wherein each light isolator window is aligned with one of the plurality of selectable icons and with one of the plurality of light emitters in an assembled position of the touchscreen assembly.

23. The touchscreen assembly of claim 22, wherein each PCBA window corresponds with one of the plurality of selectable icons and one of the plurality of light isolator windows;

wherein each PCBA window is aligned with one of the plurality of selectable icons and one of the plurality of light isolator windows in the assembled position of the touchscreen assembly.

24. The touchscreen assembly of claim 18, wherein the plurality of selectable icons comprises transparent portions of the touchscreen and a remainder of the touchscreen is opaque;

wherein light reflected from each of the plurality of light emitters is emitted through each of the plurality of selectable icons.

25. The touchscreen assembly of claim 18, wherein the plurality of light emitters comprises LEDs.

26. The touchscreen assembly of claim 18, wherein the plurality of input regions comprises capacitance touch traces.

27. A lock assembly comprising:

an interior assembly and an exterior assembly, the exterior assembly comprising an exterior lock housing and a touchscreen assembly, the touchscreen assembly comprising:

a touchscreen having a plurality of icons on a front surface of the touchscreen;

a printed circuit board assembly (PCBA) having a front face directed toward the touchscreen and an opposite rear face directed away from the touchscreen, the PCBA including a plurality of PCBA windows;

a plurality of light emitters positioned on the rear face of the PCBA, each of the plurality of light emitters being positioned adjacent to a corresponding one of the plurality of PCBA windows; and a support structure facing the rear face of the PCBA, the support structure having a plurality of icon cavities, each of the plurality of icon cavities structured to reflect light emitted from the plurality of light emitters toward the front surface of the touchscreen;

wherein the plurality of icon cavities is aligned with the plurality of PCBA windows such that light reflected by the support structure passes through the PCBA.

* * * * *